United States Patent
Bolouri-Saransar et al.

(10) Patent No.: US 9,461,418 B2
(45) Date of Patent: *Oct. 4, 2016

(54) COMPENSATION NETWORK USING AN ORTHOGONAL COMPENSATION NETWORK

(71) Applicant: Panduit Corp., Tinley Park, IL (US)

(72) Inventors: Masud Bolouri-Saransar, Orland Park, IL (US); Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,130

(22) Filed: Mar. 10, 2015

(65) Prior Publication Data

US 2015/0180177 A1 Jun. 25, 2015

Related U.S. Application Data

(63) Continuation of application No. 13/681,480, filed on Nov. 20, 2012, now Pat. No. 9,088,116.

(60) Provisional application No. 61/563,079, filed on Nov. 23, 2011.

(51) Int. Cl.
| | |
|---|---|
| *H05K 1/02* | (2006.01) |
| *H01R 24/00* | (2011.01) |
| *H04B 3/32* | (2006.01) |
| *H01R 13/6464* | (2011.01) |
| *H01R 13/66* | (2006.01) |
| *H01R 24/60* | (2011.01) |
| *H01R 24/64* | (2011.01) |

(52) U.S. Cl.
CPC ........ *H01R 23/005* (2013.01); *H01R 13/6464* (2013.01); *H01R 13/6658* (2013.01); *H01R 24/60* (2013.01); *H04B 3/32* (2013.01); *H01R 24/64* (2013.01)

(58) Field of Classification Search
CPC ... H01R 23/005; H01R 13/6464; H04B 3/32
USPC .............................................. 333/5
See application file for complete search history.

(56) References Cited

U.S. PATENT DOCUMENTS

| | | | |
|---|---|---|---|
| 5,295,869 A | 3/1994 | Siemon et al. | |
| 5,299,956 A | 4/1994 | Brownell et al. | |
| 5,310,363 A | 5/1994 | Brownell et al. | |
| 5,362,257 A | 11/1994 | Neal et al. | |
| 5,432,484 A | 7/1995 | Klas et al. | |
| 5,459,643 A | 10/1995 | Siemon et al. | |
| 5,470,244 A | 11/1995 | Lim et al. | |
| 5,474,474 A | 12/1995 | Siemon et al. | |
| 5,547,405 A * | 8/1996 | Pinney ............... | H01R 13/6625 439/676 |

(Continued)

*Primary Examiner* — Stephen E Jones
*Assistant Examiner* — Scott S Outten
(74) *Attorney, Agent, or Firm* — Christopher S. Clancy; James H. Williams; Yuri Astvatsaturov

(57) ABSTRACT

In one embodiment, the present invention is a communication connector, comprising a compensation circuit for providing a compensating signal to approximately cancel an offending signal over a range of frequency, the compensation circuit including a capacitive coupling with a first magnitude growing at a first rate over the range of frequency and a mutual inductive coupling with a second magnitude growing at a second rate over the range of frequency, the second rate being greater than the first rate (e.g., the second rate approximately double the first rate).

12 Claims, 34 Drawing Sheets

(56) References Cited

U.S. PATENT DOCUMENTS

| | | |
|---|---|---|
| 5,586,914 A | 12/1996 | Foster, Jr. et al. |
| 5,626,497 A | 5/1997 | Bouchan et al. |
| 5,673,009 A | 9/1997 | Klas et al. |
| 5,700,167 A | 12/1997 | Pharney et al. |
| 5,791,943 A | 8/1998 | Lo et al. |
| 5,938,479 A | 8/1999 | Paulson et al. |
| 5,997,358 A | 12/1999 | Adriaenssens et al. |
| 6,023,200 A | 2/2000 | Rhee |
| 6,089,923 A | 7/2000 | Phommachanh |
| 6,099,357 A | 8/2000 | Reichle |
| 6,113,418 A | 9/2000 | Kjeldahl |
| 6,168,474 B1 | 1/2001 | German et al. |
| 6,176,742 B1 | 1/2001 | Arnett et al. |
| 6,186,834 B1 | 2/2001 | Arnett et al. |
| 6,196,880 B1 | 3/2001 | Goodrich et al. |
| 6,231,397 B1 | 5/2001 | De La Borbolla et al. |
| 6,270,381 B1 | 8/2001 | Adriaenssens et al. |
| 6,283,795 B1 | 9/2001 | Chen |
| 6,346,010 B1 | 2/2002 | Emplit |
| 6,356,162 B1 | 3/2002 | DeFlandre et al. |
| 6,379,157 B1 | 4/2002 | Curry et al. |
| 6,435,918 B1 | 8/2002 | Chen |
| 6,443,776 B2 | 9/2002 | Reichle |
| 6,464,529 B1 | 10/2002 | Jensen et al. |
| 6,464,541 B1 | 10/2002 | Hashim et al. |
| 6,533,618 B1 | 3/2003 | Aekins |
| 6,612,880 B2 | 9/2003 | Arnett et al. |
| 6,866,548 B2 | 3/2005 | Hashim |
| 6,916,209 B1 | 7/2005 | Casher et al. |
| 6,964,587 B2 | 11/2005 | Colantuono et al. |
| 7,038,554 B2 | 5/2006 | Seefried |
| 7,048,590 B2 | 5/2006 | Colantuono et al. |
| 7,052,328 B2 | 5/2006 | Ciezak et al. |
| 7,057,899 B2 | 6/2006 | AbuGhazaleh et al. |
| 7,086,909 B2 | 8/2006 | Colantuono et al. |
| 7,140,924 B2 | 11/2006 | Redfield et al. |
| 7,153,168 B2 | 12/2006 | Caveney et al. |
| 7,154,049 B2 | 12/2006 | Celella et al. |
| 7,166,000 B2 | 1/2007 | Pharney |
| 7,168,993 B2 | 1/2007 | Hashim |
| 7,175,476 B2 | 2/2007 | Kim et al. |
| 7,176,383 B2 | 2/2007 | Lauffer et al. |
| 7,179,131 B2 | 2/2007 | Caveney et al. |
| 7,182,649 B2 | 2/2007 | Caveney et al. |
| 7,190,594 B2 | 3/2007 | Hashim et al. |
| 7,201,618 B2 | 4/2007 | Ellis et al. |
| 7,204,722 B2 | 4/2007 | Hashim et al. |
| 7,252,554 B2 | 8/2007 | Caveney et al. |
| 7,265,300 B2 | 9/2007 | Adriaenssens et al. |
| 7,281,957 B2 | 10/2007 | Caveney |
| 7,294,025 B1 | 11/2007 | Chen |
| 7,301,780 B2 | 11/2007 | AbuGhazaleh et al. |
| 7,309,261 B2 | 12/2007 | Caveney et al. |
| 7,314,393 B2 | 1/2008 | Hashim |
| 7,320,624 B2 | 1/2008 | Hashim et al. |
| 7,364,470 B2 | 4/2008 | Hashim |
| 7,367,849 B2 | 5/2008 | Wang et al. |
| 7,381,098 B2 | 6/2008 | Hammond, Jr. et al. |
| 7,384,315 B2 | 6/2008 | Caveney et al. |
| 7,402,085 B2 | 7/2008 | Hammond, Jr. et al. |
| 7,427,218 B1 | 9/2008 | Hashim et al. |
| 7,442,092 B2 | 10/2008 | Caveney et al. |
| 7,452,246 B2 | 11/2008 | Caveney et al. |
| 7,481,681 B2 | 1/2009 | Caveney et al. |
| 7,485,010 B2 | 2/2009 | Aekins |
| 7,500,883 B2 | 3/2009 | Ciezak et al. |
| 7,520,784 B2 | 4/2009 | Caveney et al. |
| 7,537,484 B2 | 5/2009 | Reeves et al. |
| 7,591,686 B2 | 9/2009 | Ellis et al. |
| 7,591,689 B2 | 9/2009 | Caveney et al. |
| 7,618,296 B2 | 11/2009 | Caveney |
| 7,677,930 B2 | 3/2010 | Hashim et al. |
| 7,677,931 B2 | 3/2010 | Aekins |
| 7,682,203 B1 | 3/2010 | Pharney et al. |
| 7,686,650 B2 | 3/2010 | Belopolsky et al. |
| 7,726,018 B2 | 6/2010 | Caveney et al. |
| 7,787,615 B2 | 8/2010 | Hammond, Jr. et al. |
| 7,823,281 B2 | 11/2010 | Caveney et al. |
| 7,824,231 B2 | 11/2010 | Marti et al. |
| 7,841,909 B2 | 11/2010 | Murray et al. |
| 7,850,492 B1 | 12/2010 | Straka et al. |
| 7,854,632 B2 | 12/2010 | Reeves et al. |
| 7,874,878 B2 | 1/2011 | Fite et al. |
| 7,874,879 B2 | 1/2011 | Caveney et al. |
| 7,892,040 B2 | 2/2011 | Ellis et al. |
| 7,909,656 B1 | 3/2011 | Erickson et al. |
| 7,914,345 B2 | 3/2011 | Bopp et al. |
| 7,914,346 B2 | 3/2011 | Pharney et al. |
| 7,927,153 B2 | 4/2011 | Straka et al. |
| 7,955,139 B2 | 6/2011 | Straka et al. |
| 7,967,645 B2 | 6/2011 | Marti et al. |
| 7,976,348 B2 | 7/2011 | Aekins et al. |
| 7,976,349 B2 | 7/2011 | Heckmann |
| 7,980,900 B2 | 7/2011 | Hashim et al. |
| 7,985,103 B2 | 7/2011 | Straka et al. |
| 8,002,571 B2 | 8/2011 | Hogue et al. |
| 8,007,311 B2 | 8/2011 | Hogue et al. |
| 8,011,972 B2 | 9/2011 | Caveney et al. |
| 8,016,621 B2 | 9/2011 | Bopp et al. |
| 8,038,482 B2 | 10/2011 | Erickson et al. |
| 8,047,879 B2 | 11/2011 | Hashim |
| 8,052,483 B1 | 11/2011 | Straka et al. |
| 8,128,437 B2 | 3/2012 | Straka et al. |
| 8,403,709 B2 | 3/2013 | Hammond, Jr. et al. |
| 2005/0239340 A1 | 10/2005 | Jackson |
| 2010/0048040 A1 | 2/2010 | Straka et al. |
| 2010/0167589 A1 | 7/2010 | Hammond, Jr. et al. |
| 2010/0190357 A1 | 7/2010 | Hashim |
| 2010/0317230 A1 | 12/2010 | Larsen et al. |
| 2011/0086549 A1 | 4/2011 | Caveney et al. |
| 2011/0122767 A1 | 5/2011 | Dent |
| 2011/0318970 A1 | 12/2011 | Hammond, Jr. et al. |
| 2012/0003874 A1 | 1/2012 | Reeves et al. |

* cited by examiner

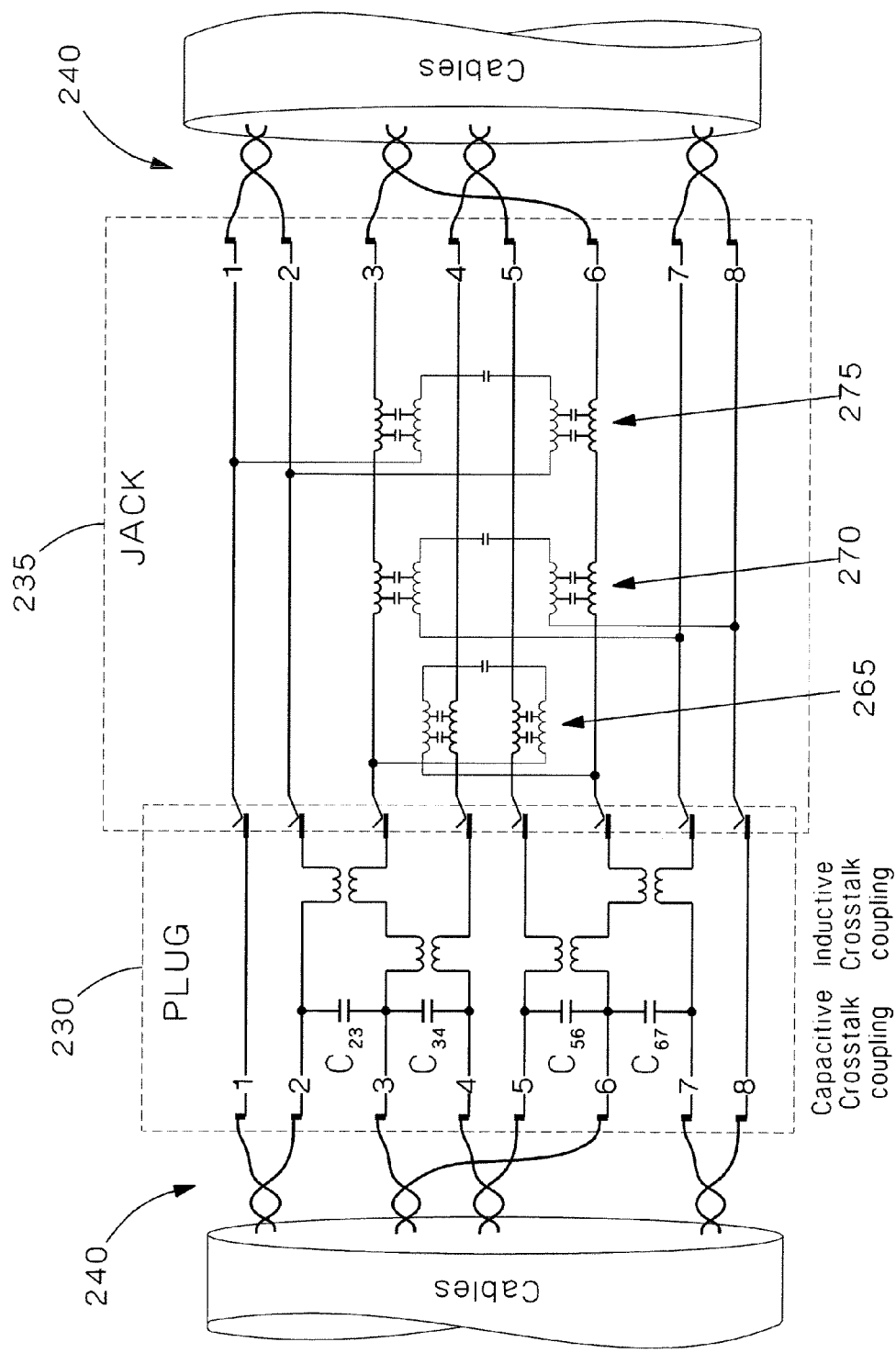

COMPENSATION NETWORK USING AN ORTHOGONAL COMPENSATION NETWORK

CROSS-REFERENCE TO RELATED APPLICATIONS

This application is a continuation of U.S. patent application Ser. No. 13/681,480, filed Nov. 20, 2012, and claims the benefit of U.S. Provisional Patent Application No. 61/563,079, filed on Nov. 23, 2011, which is incorporated by reference in its entirety.

FIELD OF INVENTION

The present invention generally relates to network communication, and more specifically, to methods, systems, and apparatuses directed towards compensating resulting crosstalk and/or improving return loss in network connectors.

BACKGROUND

The return loss of a connector system can be adversely affected when the impedance (of two conductors forming a transmission line) through the connector is not. This connector impedance can be affected by the compensation network that is applied within a jack, and in certain instances, the compensation network can increase the return loss.

Crosstalk in a plug-jack connector system can manifest itself as NEXT (Near End Crosstalk) and FEXT (Far End Crosstalk). A schematic cross-sectional view of connecting hardware components, and a communications signal path through them, is shown in FIGS. 1A and 1B. In particular, FIG. 1A illustrates a plug 100 connected to a jack 105 both of which have communication cables 110,115 attached thereto, respectively. The jack 105 includes a printed circuit board (PCB) 120 with insulation displacement contacts (IDCs) 125 and plug interface contacts (PICs) 130. The communication signal passing through the connecting hardware is illustrated in FIG. 1B as the dotted line 135.

Associated with the plug 100 there exists a known amount of offending crosstalk (set by an ANSI/TIA (American National Standards Institute/Telecommunications Industry Association) standard) between any two wire-pairs. This offending crosstalk may be canceled or reduced by a compensating signal within the jack 105. In order to cancel or reduce the offending crosstalk, a compensating signal that is approximately 180° out of phase with the offending plug-crosstalk may need to be injected. Because of the propagation delay between the plug's 100 offending crosstalk signal and the compensating signal that is injected within the jack 105, the two signals cannot totally cancel each other in the frequency range of interest. There will be a remaining uncompensated signal that will limit the performance of the system with respect to the NEXT performance specification.

FIG. 2 shows a generalized example of a prior-art connecting hardware system where crosstalk 140 occurs and a single compensation stage 145 is implemented. The coupling (that creates the offending crosstalk and compensation signals) in connectors arises from capacitive and/or mutual inductive coupling. The coupling magnitude is dependent on the physical construction and dimensions of the signal conductors, the material properties, and the magnitude of the signal. This coupling is also proportional to frequency (approximately 20 dB/decade). An equivalent representation of the coupling in the connecting hardware of FIG. 2 is shown in FIG. 3. The 90° (offending crosstalk signal 50) and the −90° (compensation signal 55) coupling are shown with reference to the source signal traveling on the sour wire-pair 60.

The source signal energy propagates from coupling location A to coupling location B (propagation time=T/2), couples to the sink wire-pair 65 (forming the compensation signal), and then propagates back to coupling location A (having another propagation time of T/2) on the sink wire-pair with a resultant time delay T. FIG. 4 illustrates a lumped approximation of the magnitude and polarity for the offending crosstalk vector A and the compensation vector B on a time axis.

The round trip time delay T is due to distance between the coupling location A and the coupling location B, and the signal's velocity. While this time delay is fixed, the compensating signal's phase difference of 180° (at very low frequencies) increases at higher frequencies. The magnitude of each coupling will typically increase with frequency as well (e.g., at a 20 dB per decade slope). A complex vectorial summation of the two signals A and B creates the remaining uncompensated signal which results in the NEXT signal. FIG. 5 is a vector diagram in polar form of the offending crosstalk vector A, the compensating vector B, and the resultant signal (i.e., NEXT vector) for a typical connecting hardware with a typical distance and materials between offending plug-crosstalk and compensating coupling positions. In order to be able to present small coupling signals simultaneously with large coupling signals on the same diagram, the magnitude of the couplings is presented in logarithmic (dB) scale relative to the source signal. The five dots represent the vectors' magnitudes at the following frequencies: 1, 10, 100, 250, and 500 MHz.

By choosing the vectors A and B of equal magnitudes with reverse polarity (i.e., approximately 180° out of phase), the vectors A and B's combined crosstalk will be approximately zero, or at least relatively negligible, only at low frequencies. This is because at such low frequencies the phase difference between the A and B vectors is close to 180°. However, at higher frequencies the phase difference grows, resulting in a bigger combined NEXT magnitude. For this reason, the physical distance between the offending crosstalk in the plug and the compensation can be important. For a fixed signal velocity, the closer the plug coupling crosstalk position (A) is to the compensation coupling position (B), the higher the possible bandwidth the connector design will have (due to the smaller phase difference).

By using this basic single-stage method (with conventional materials and dimensions) the crosstalk can be maintained at an acceptable level up to approximately 100 MHz resulting in a connector that will comply with Category 5e (ANSI/TIA-568-C.2) requirements for NEXT. A typical NEXT signal (the resultant signal) as a function of frequency for an existing single-stage-compensation system is illustrated in FIG. 6.

To achieve a superior NEXT performance level at higher frequencies, multiple-compensation-stage methods have been introduced by the industry. An example of such a multiple-compensation-stage technique is shown in FIG. 7, which illustrates an additional compensation stage 150 that was added after (with respect to distance or time) the first compensating stage 145. In this case, the magnitude of the first compensating coupling 145 needs to be adjusted to offset the additional compensation stage 150.

An equivalent diagram of the coupling in the connecting hardware of FIG. 7 is shown in FIG. 8, and a lumped approximation of the signal magnitude and polarity for the offending crosstalk vector A, first stage compensation vector B, and additional compensation vector C on a time axis is shown in FIG. 9. The magnitudes and phases of these vectors relative to each other are illustrated in FIG. 10 on a polar axis plot. The magnitudes of the couplings are presented in logarithmic (dB) scale relative to the source signal. The five dots again represent the vectors' magnitudes at the following frequencies: 1, 10, 100, 250, and 500 MHz.

With vector A's location as a reference, with increasing frequency, vector B's phase shift will grow clockwise towards vector A, and vector C's phase shift will grow clockwise more swiftly (due to its location further away from A) in opposition to vector A. Selecting |B| equal to |A+C| at a given a frequency, requires that |B|<|A+C| below that given frequency. To demonstrate the occurrence more clearly, FIG. 11 shows a typical combined crosstalk performance through frequency for a two-stage-compensation jack. The approach is largely relying on the phase of A+C being equal or very close to the coupling B's phase over the entire frequency spectrum of interest for the connector.

The magnitude of |A+C| is greater than the magnitude of |B| in the low end of the frequency bandwidth. At a certain (predetermined) frequency, the magnitude of |A+C| will be equal to the magnitude of |B| (creating a minimum as shown in FIG. 11). At the higher end of the frequency bandwidth of the connector, the magnitude of |A+C| will be smaller than magnitude 1131, resulting in an increasing resultant magnitude. This prior art design technique improves the frequency bandwidth of the connector by reducing the phase delay's effect on the first stage compensation vector.

Another example of multiple-stage compensation is illustrated in FIG. 12. The order of compensation couplings are as follows: a first compensation stage 145 providing compensating coupling; a second compensating stage 150 providing crosstalk coupling; and then a third compensation stage 155 providing compensating coupling. The sum of the numeric magnitude of the crosstalk couplings (offending and compensating crosstalk) and compensating coupling needs to be close to each other. An equivalent diagram of the three-stage compensating coupling in a connecting hardware is shown in FIG. 13, and a lumped approximation of the magnitude and polarity of the occurring vectors is shown in FIG. 14 along a time a time axis. In particular, FIG. 14 shows vector A representing coupling from the offending crosstalk, vector B representing the coupling from the first compensation stage, vector C representing the coupling from the second compensation stage, and vector D representing the coupling from the third compensation stage.

In order for a three-stage compensation technique to work, the flowing conditions should be valid: (i) the magnitude of the offending crosstalk coupling A is close to the magnitude of compensating coupling D; (ii) the magnitude of the compensating crosstalk coupling C is close to the magnitude of compensating coupling B; (iii) the combined magnitude of the couplings B and C are greater than combined magnitude of couplings A and D; and (iv) the numeric summation of coupling A and coupling C is approximately equal to numeric summation of coupling B and coupling D.

FIG. 15 illustrates the vector magnitudes and phases relative to each other in a polar axis for a three-stage compensation technique. The magnitudes of the couplings are presented in logarithmic (dB) scale relative to source signal. The five dots present the vectors' positions at 1, 10, 100, 250, and 500 MHz. The summation of the vectors of this three-stage compensation technique over a frequency range is shown further in FIG. 16. At one frequency the phase shift of vectors (A+C) and (B+D) will obtain exact opposite polarity (180° out of phase) which will drive the summation of all vectors (i.e., |A|+|B|+|C|+|D|) to take a dip in magnitude.

The various multi-stage compensation methods described above generally require additional coupling stages with more overall coupling. This can make connectors which employ such compensation techniques more sensitive to tolerances in manufacturing processes. Additionally, due to the high coupling magnitude of the compensation vectors a wire-pair's impedance will likely be affected resulting in an impedance mismatch with the cable and a poor return loss. Improved compensation techniques for use in network connectors are desired.

SUMMARY

Accordingly, the present invention is generally directed to apparatuses, systems, and methods associated with improved network connectors.

In one embodiment, the present invention is a communication connector, comprising a compensation circuit for providing a compensating signal to approximately cancel an offending signal over a range of frequency, the compensation circuit including a capacitive coupling with a first magnitude growing at a first rate over the range of frequency and a mutual inductive coupling with a second magnitude growing at a second rate over the range of frequency, the second rate approximately double the first rate.

In yet another embodiment, the present invention is a communication connector, comprising a first differential pair of conductors and a second differential pair of conductors, wherein the first differential pair of conductors capacitively and mutual-inductively couples to the second differential pair of conductors.

In still yet another embodiment, the present invention is a method of compensating for an offending signal in a communication connector over a range of frequency, the method including the steps of providing a capacitive coupling, and connecting a mutual inductive coupling approximately concurrently with the capacitive coupling, wherein the mutual inductive coupling is approximately orthogonal with the capacitive coupling.

These and other features, aspects, and advantages of the present invention will become better understood with reference to the following drawings, description, and any claims that may follow.

BRIEF DESCRIPTION OF DRAWINGS

FIG. 30 illustrates a more detailed view of the compensation occurring in FIG. 29C.

DETAILED DESCRIPTION

Figure 1A:
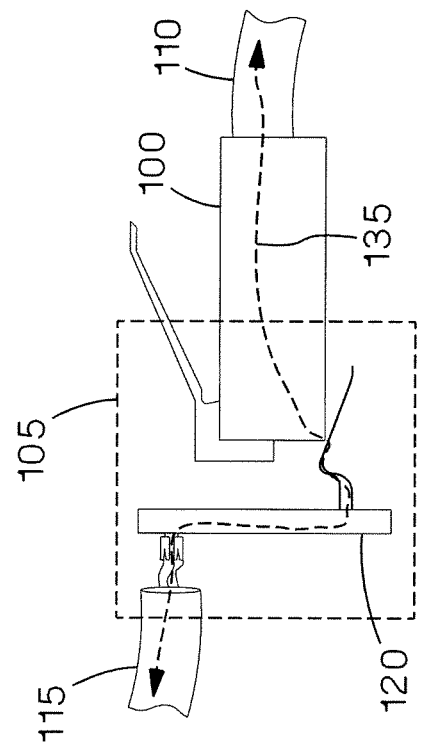
FIGS. 1A and 1B illustrate a generalized structure of a communication plug mated to a communication jack.
Figure 1B:
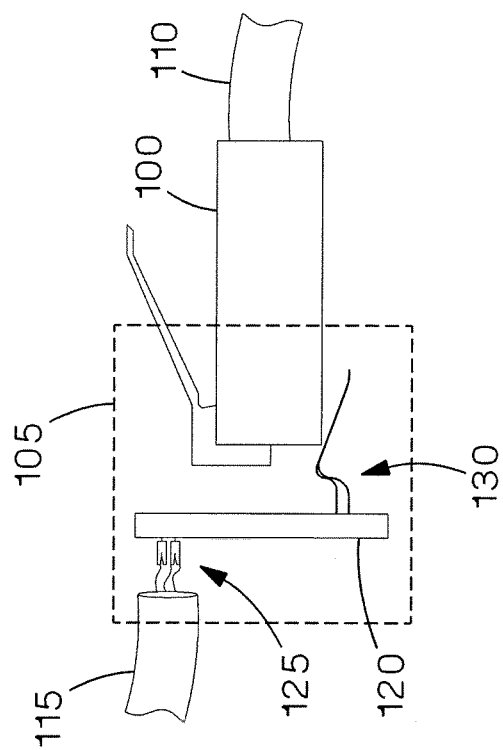
Figure 2:
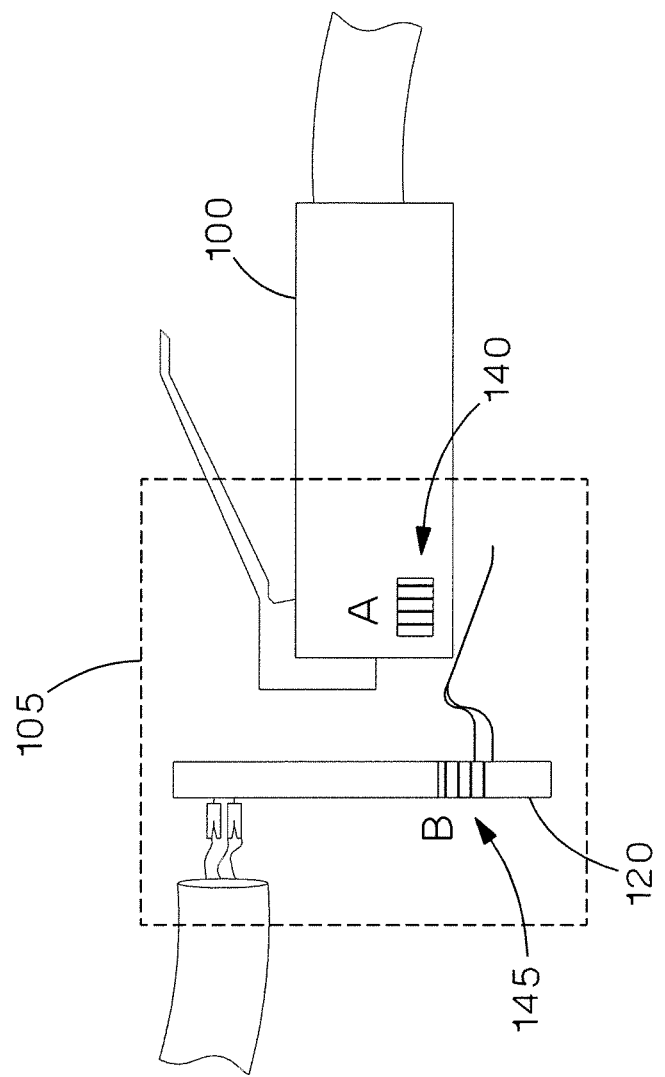
FIG. 2 illustrates a generalized example of a known single-stage compensation system.
Figure 3:
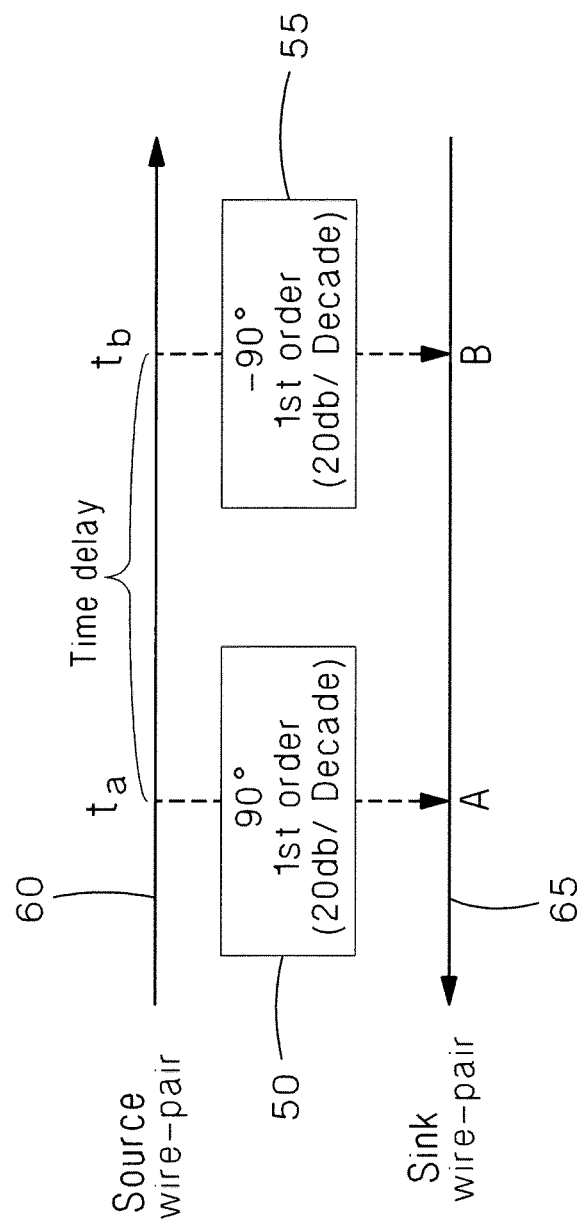
FIG. 3 illustrates the coupling occurring in the system of FIG. 2.
Figure 4:
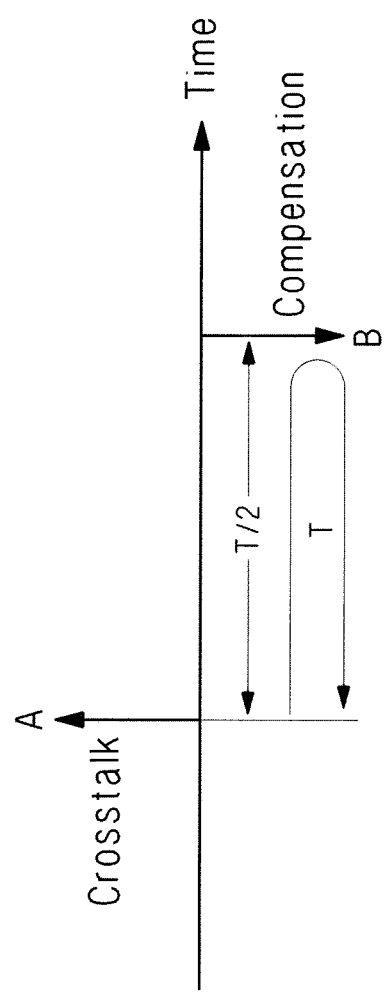
FIG. 4 illustrates a lumped approximation of the magnitudes and polarity of the coupling occurring in the system of FIG. 2.
Figure 5:
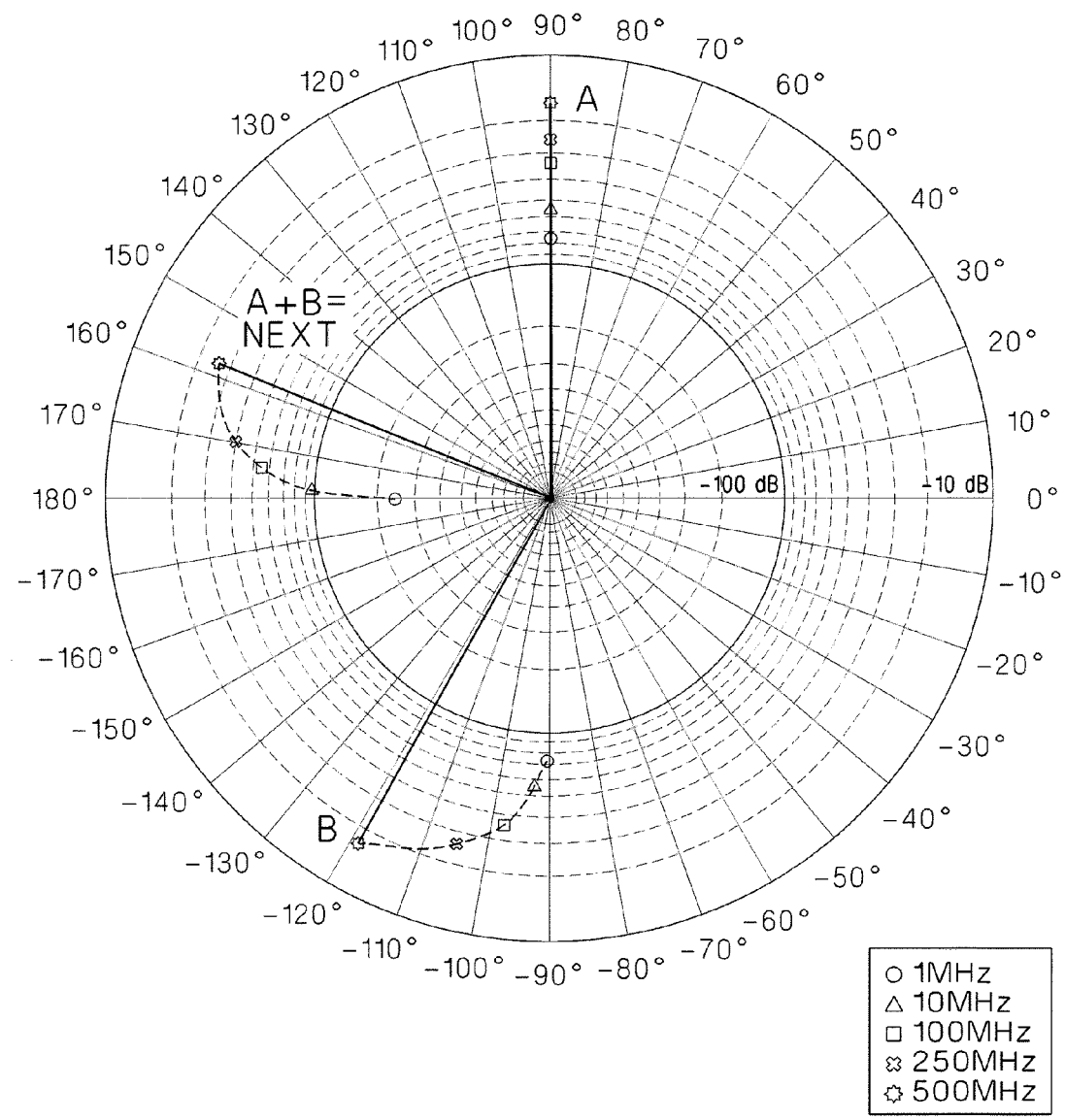
FIG. 5 illustrates a polar representation of the coupling occurring in the system of FIG. 2.
Figure 6:
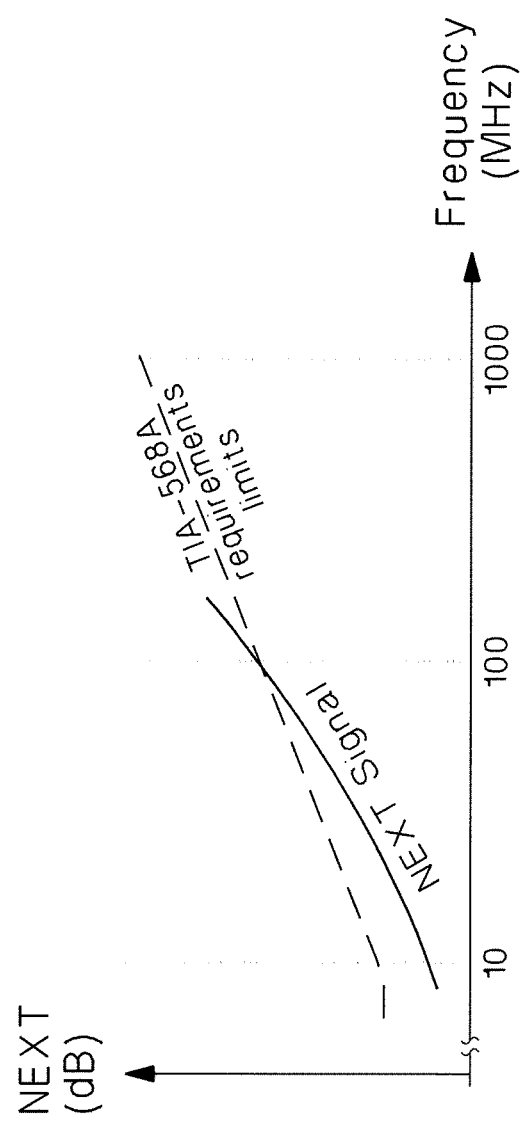
FIG. 6 illustrates the overall NEXT resulting from the system of FIG. 2.
Figure 7:
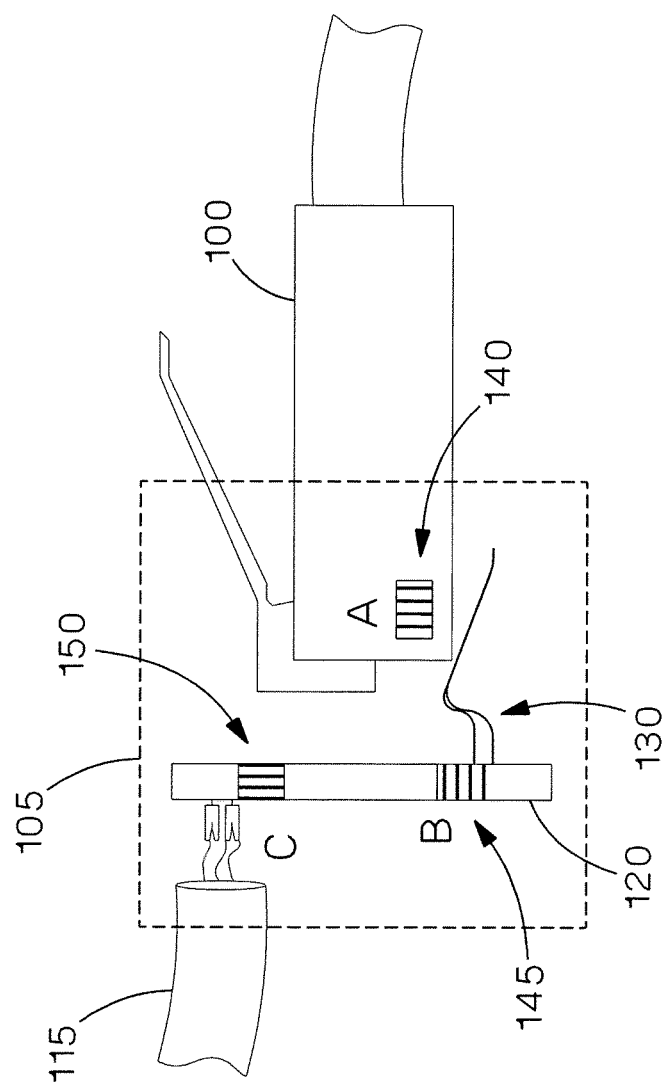
FIG. 7 illustrates a generalized example of a known two-stage compensation system.
Figure 8:
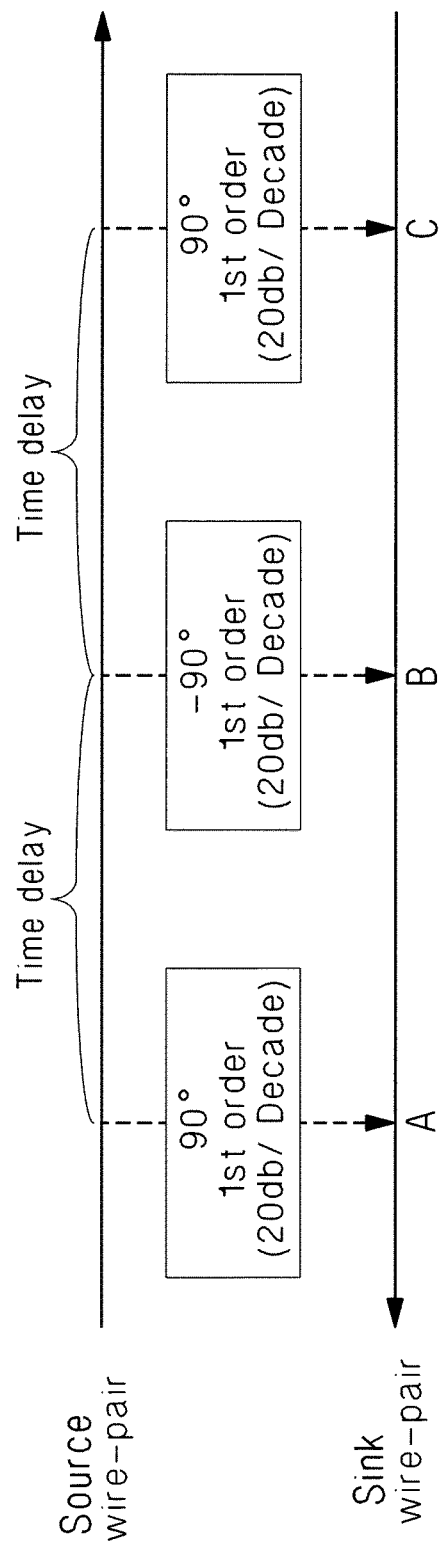
FIG. 8 illustrates the coupling occurring in the system of FIG. 7.
Figure 9:
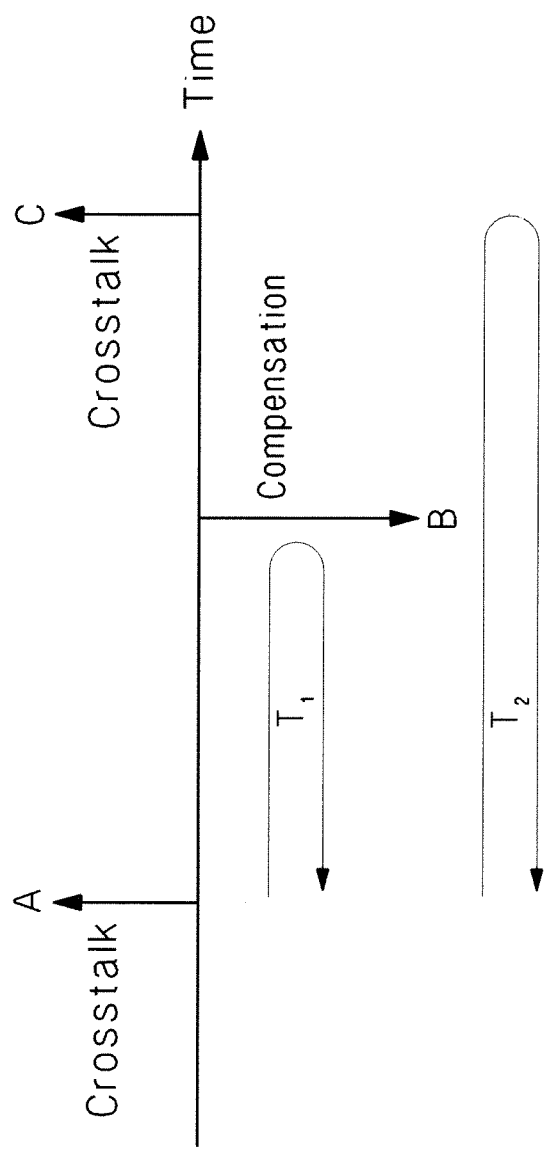
FIG. 9 illustrates a lumped approximation of the magnitudes and polarity of the coupling occurring in the system of FIG. 7.
Figure 10:
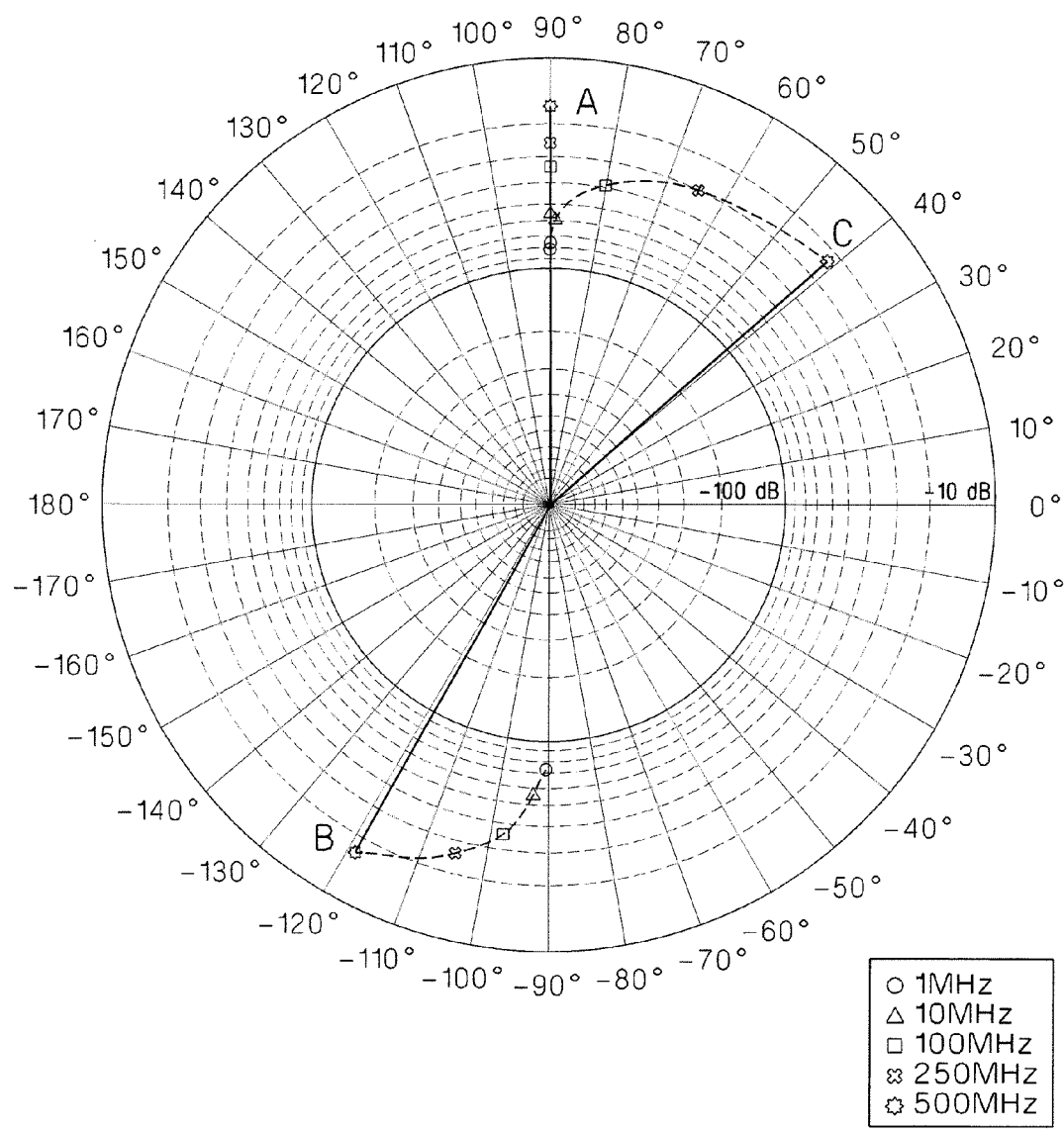
FIG. 10 illustrates a polar representation of the coupling occurring in the system of FIG. 7.
Figure 11:
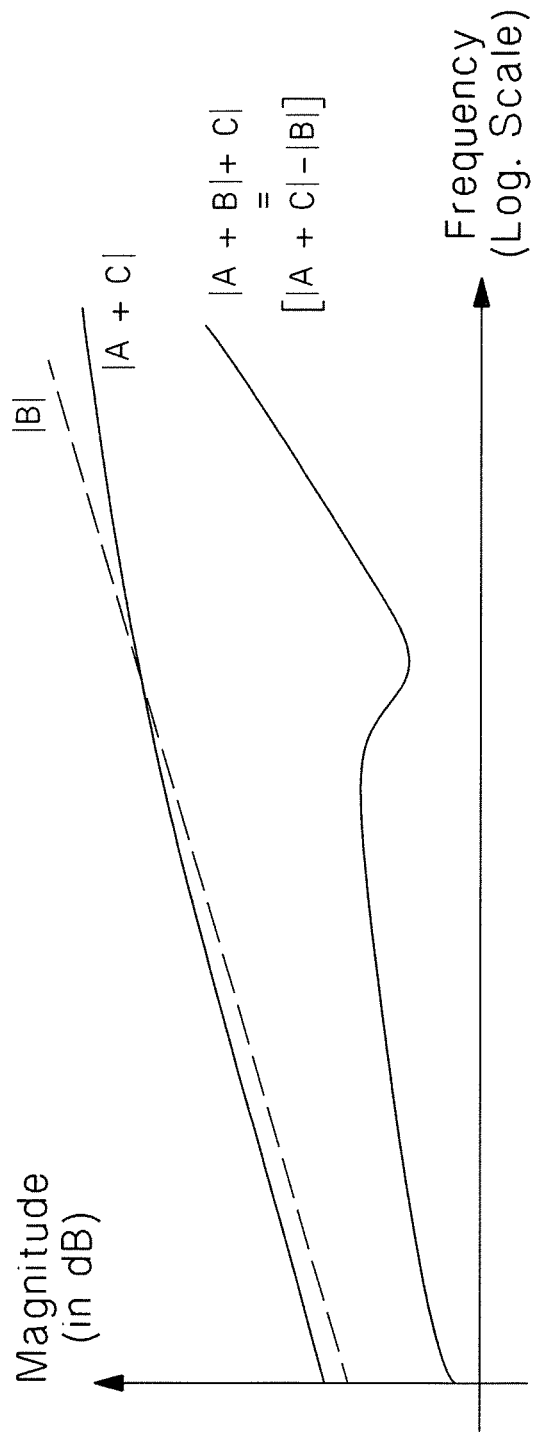
FIG. 11 illustrates the magnitudes of various couplings occurring in the system of FIG. 7 over a frequency range.
Figure 12:
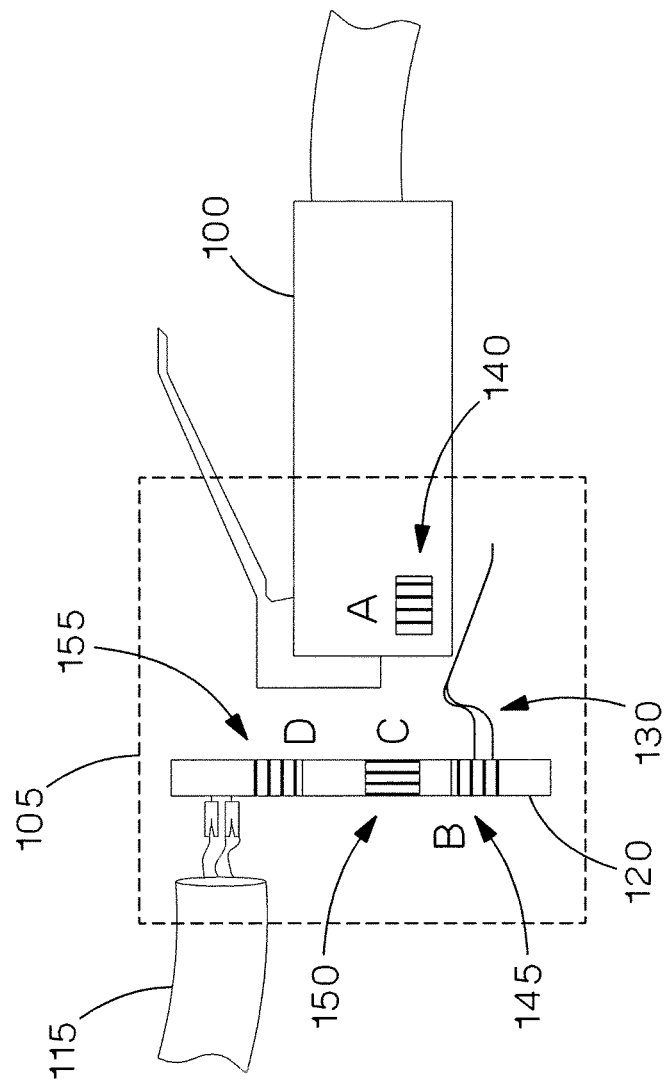
FIG. 12 illustrates a generalized example of a known three-stage compensation system.
Figure 13:
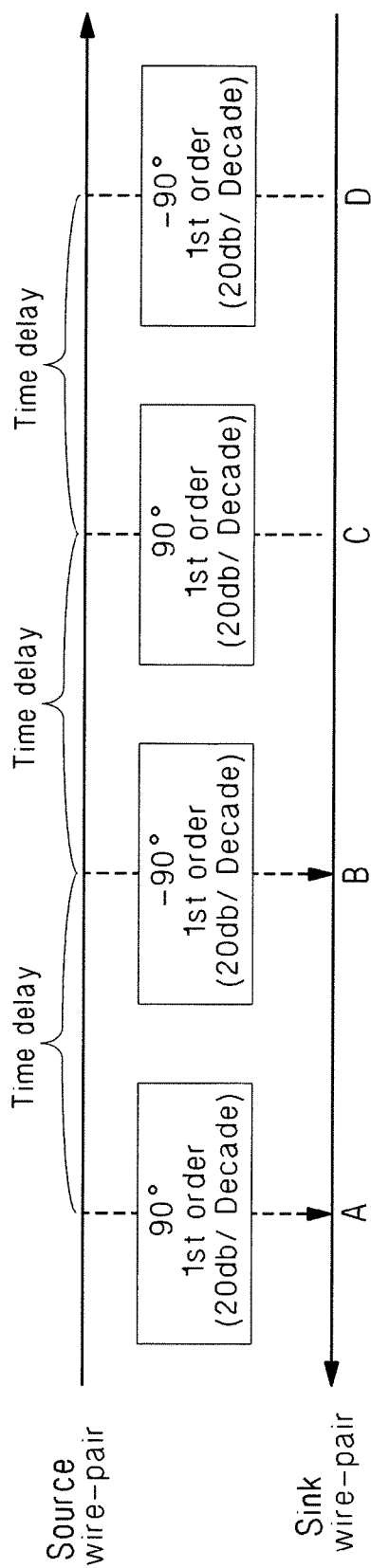
FIG. 13 illustrates the coupling occurring in the system of FIG. 12.
Figure 14:
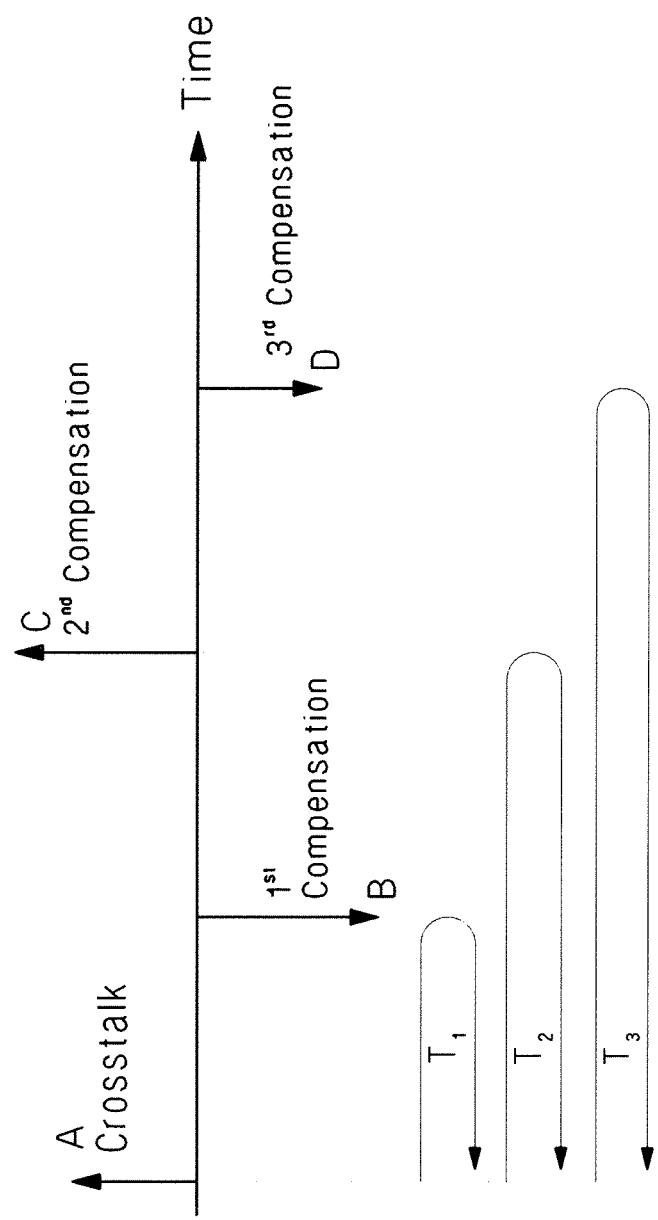
FIG. 14 illustrates a lumped approximation of the magnitudes and polarity of the coupling occurring in the system of FIG. 12.
Figure 15:
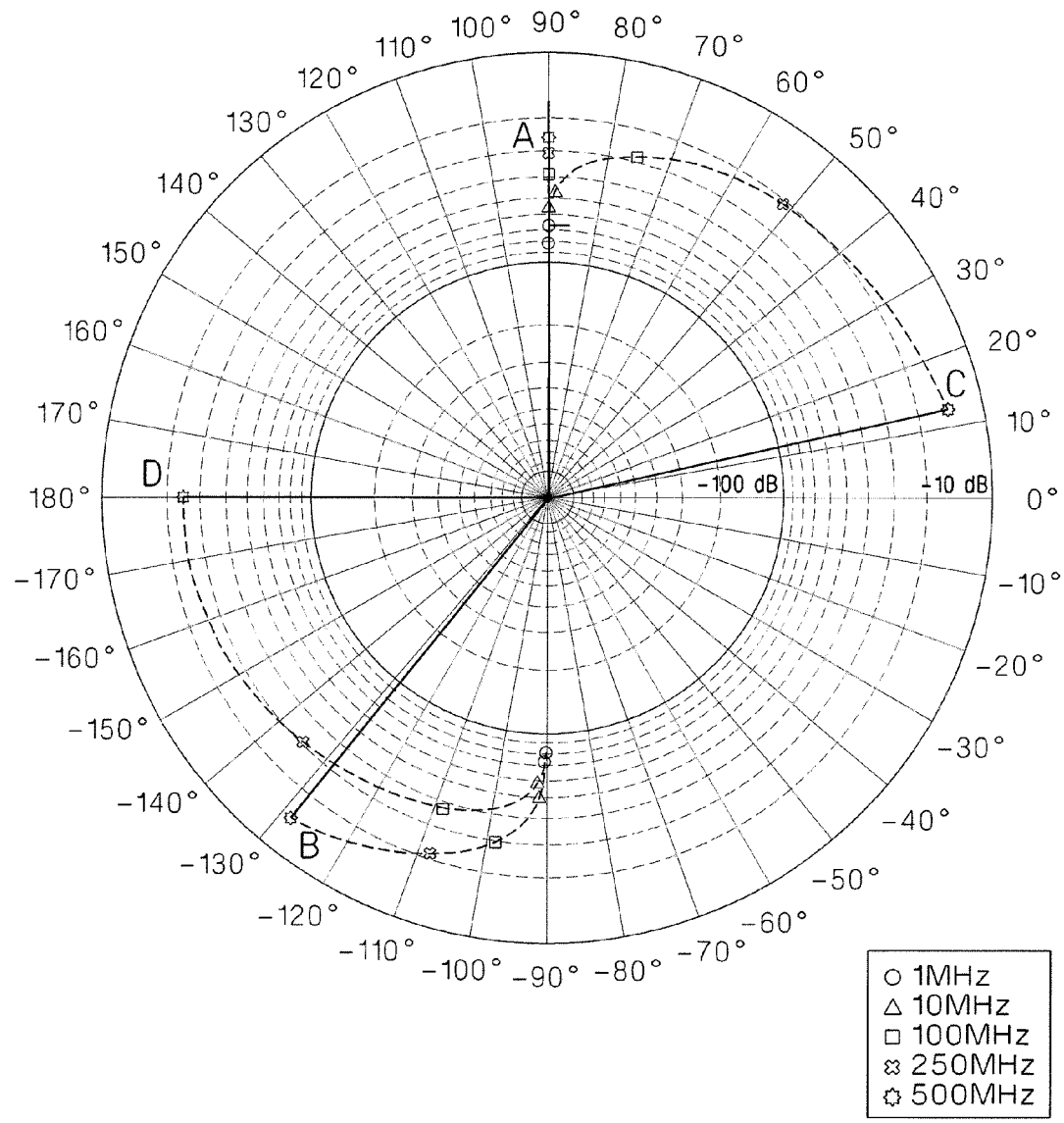
FIG. 15 illustrates a polar representation of the coupling occurring in the system of FIG. 12.
Figure 16:
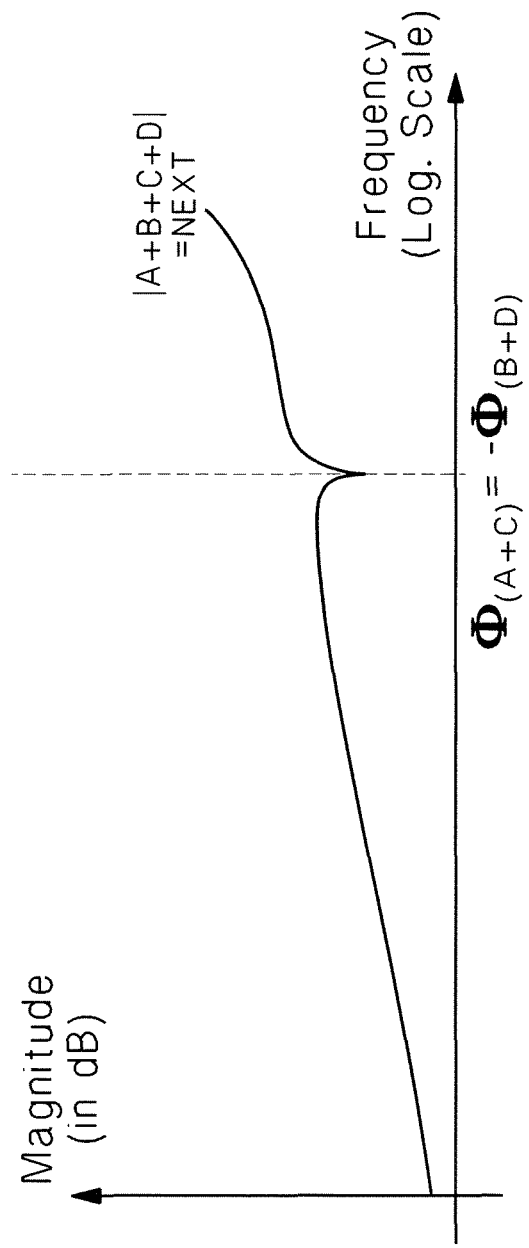
FIG. 16 illustrates the overall NEXT resulting from the system of FIG. 12.
Figure 17:
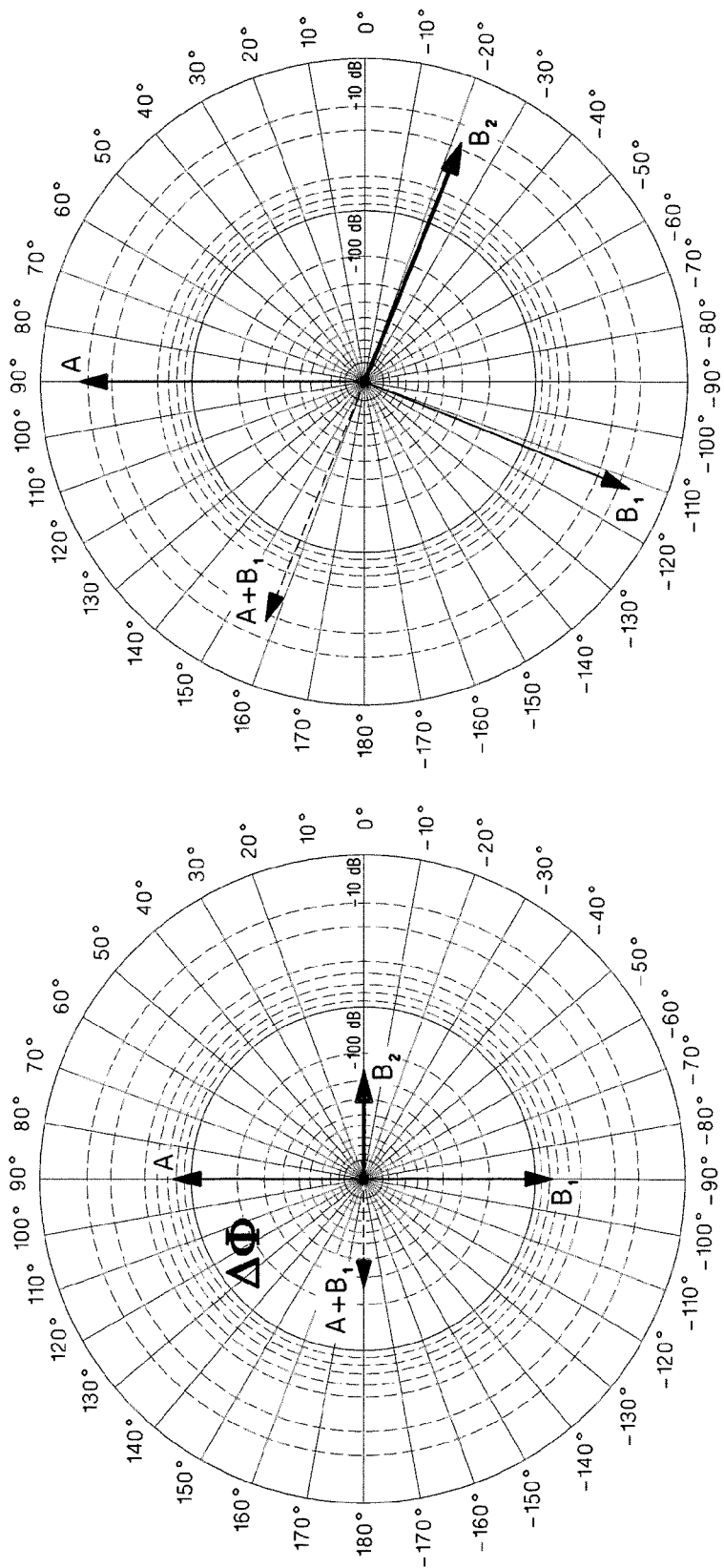
FIG. 17 illustrates a polar representation of an embodiment of the present invention.

With a closer examination of the graph illustrated in FIG. 5 it is apparent that the resultant NEXT vector has an approximately +90° phase shift relative to the compensating vector B, in the higher frequency range. In low frequencies, the magnitude of the resultant NEXT vector is insignificant. In order to offset the resultant NEXT vector, an additional coupling signal having an approximately −90° phase shift relative to the compensating vector B can be added. This added coupling signal should have an insignificant magnitude at lower frequencies while having a larger magnitude at higher frequencies. FIG. 17 illustrates the magnitude and phase of such an additional vector $B_2$ relative to the resultant vector $(A+B_1)$ at different frequencies. The additional compensating vector is indicated as $B_2$, and the main compensating vector is indicated as $B_1$.

Figure 18:
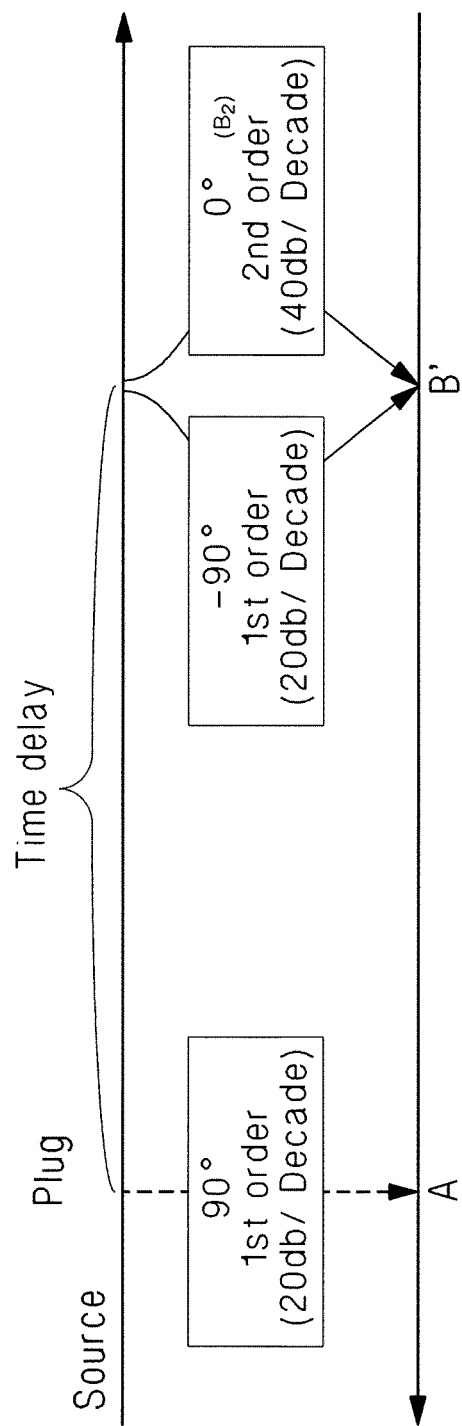
FIG. 18 illustrates the coupling occurring in a system according to an embodiment of the present invention.

The added compensation component creates an orthogonal coupling vector $B_2$ (with an approximately −90° phase difference) to the first compensation vector $B_1$. The added component's magnitude increases with frequency at a higher rate (e.g., second or higher order yielding a rate larger than 20 dB per decade) sufficient to satisfy the requirements for having an insignificant magnitude at lower frequencies and a significant magnitude at the appropriate higher frequency range. In reality, this additional $B_2$ coupling vector has the same phase as the offending source signal's phase at the location which forms the compensation vector B. With respect to time or, in effect, position, the additional compensation vector $B_2$ is in the same stage as the first compensation vector $B_1$ yielding a novel way performing single-stage compensation. Additionally, instead of introducing an additional compensation vector having either a −90° coupling or a +90° coupling, the coupling introduced has an approximate phase shift of 0° relative to the offending source signal at the location of that coupling. A representative drawing of this novel single stage coupling system is shown in FIG. 18. The point B' is the point where the aggregated coupling of component $B_1$ and component $B_2$ occur. A network that includes the novel single compensation stage inside of the connector is formed by vectors $B_1$ and $B_2$. These coupling vectors are orthogonal to each other and hence this network will be referred to as an orthogonal compensation network (OCN).

Figure 19A:
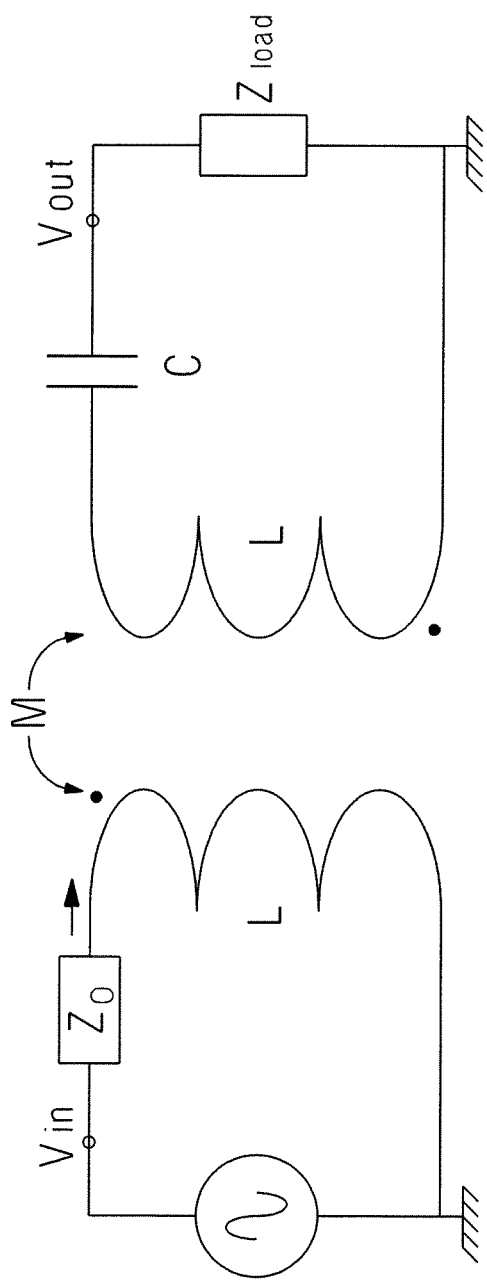
FIG. 19A illustrates a compensation circuit according to an embodiment of the present invention.
Figure 25:
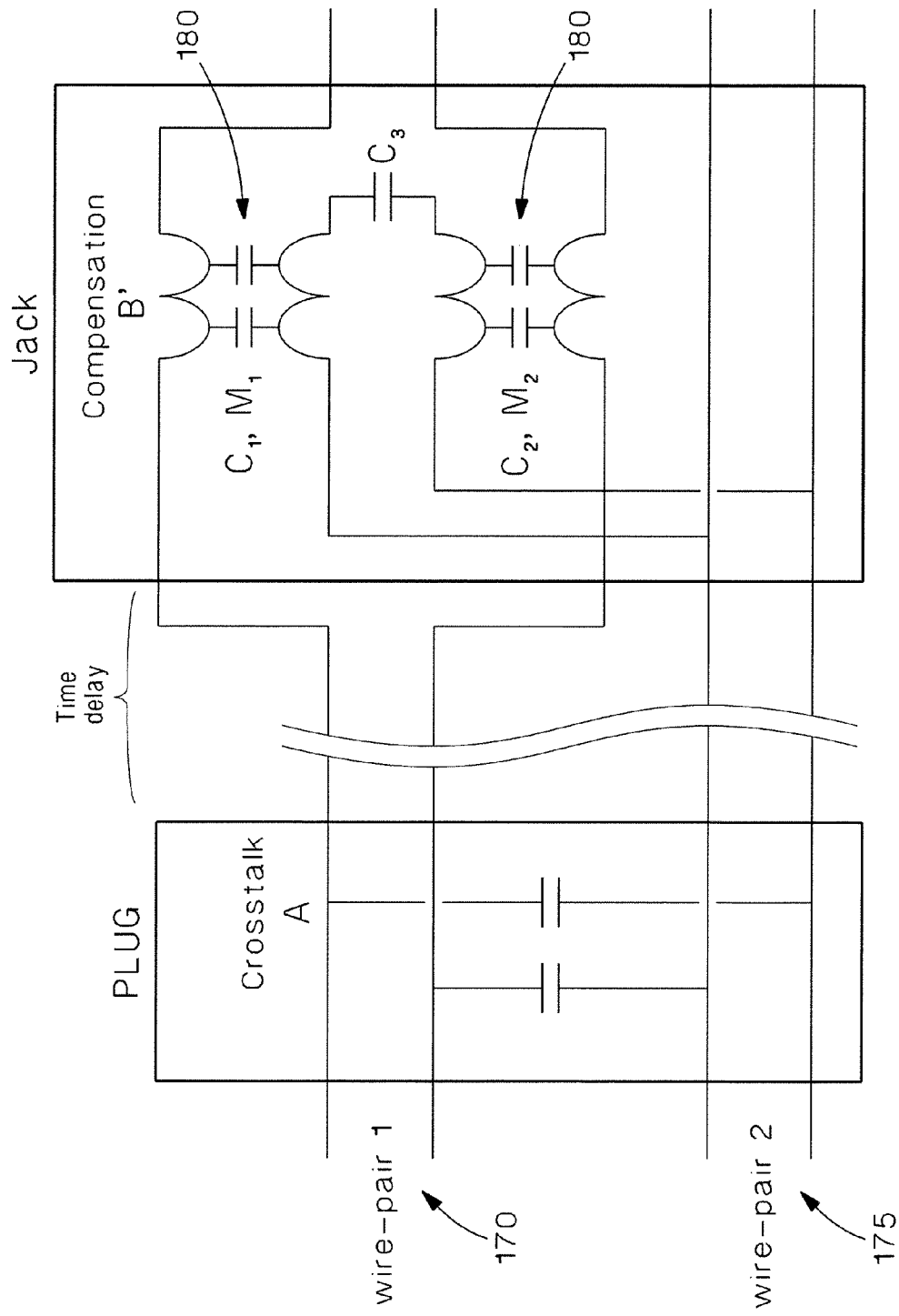
FIG. 25 illustrates a plug/jack system with differential circuit according to an embodiment of the present invention.

The following discussion begins with a conceptual realization of the OCN (as shown in FIG. 19A) and develops the conceptual realization to a realizable circuit diagram (as shown in FIG. 25).

The OCN produces two compensating signals; a first compensating signal with a predetermined magnitude with a phase that is approximately 180° out of phase from the offending crosstalk signal and a second compensating signal that has the following attributes:
- a phase that is in phase (approximately 0° phase shift) with the source signal;
- a magnitude that at low frequencies is negligible;
- a higher frequency magnitude such that when the magnitudes of both compensating signals are added to the offending crosstalk signal a null (or a minimum) is created at a particular advantageous frequency; and
- a magnitude that increases with frequency at a higher rate than the first compensating signal (e.g., 40 dB/decade).

An embodiment of the exemplary circuit topology that implements this second compensating signal is shown in FIG. 19A. The magnitude and phase of the transfer function (i.e., $H(j\omega)=V_{out}/V_{in}$, $j=\sqrt{-1}$, $\omega=2\pi f$, f frequency) can be determined via circuit analysis resulting in:

$|H(j\omega)|=\omega M Z_L/\sqrt{[Z_L Z_o-\omega^2(L-M)^2-2(L-M)M\omega^2+L/C)^2+(\omega L(Z_L+Z_o)-Z_o/(\omega C))^2]}$, and the phase $[H(j\omega)]=90°-\tan^{-1}([Z_o/(\omega C)-\omega L(Z_L+Z_o)]/[Z_L Z_o-\omega^2(L-M)^2-2(L-M)M\omega^2+L/C])$.

If we assume that $Z_L=Z_{Load}\ll Z_o$ and that $Z_{Load}\ll 1/(\omega C)$, the magnitude and the phase of the transfer function can also be simplified:

$|H(j\omega)|=\omega MZ_L/\sqrt{[(Z_L Z_o + L/C)^2 + (Z_o/(\omega C))^2]} = \omega^2 MCZ_L/Z_o$, and the phase reduces to phase $[H(j\omega)]=90°-\tan^{-1}(Z_o/(\omega(CZ_L Z_o + L)))$.

Figure 19B:
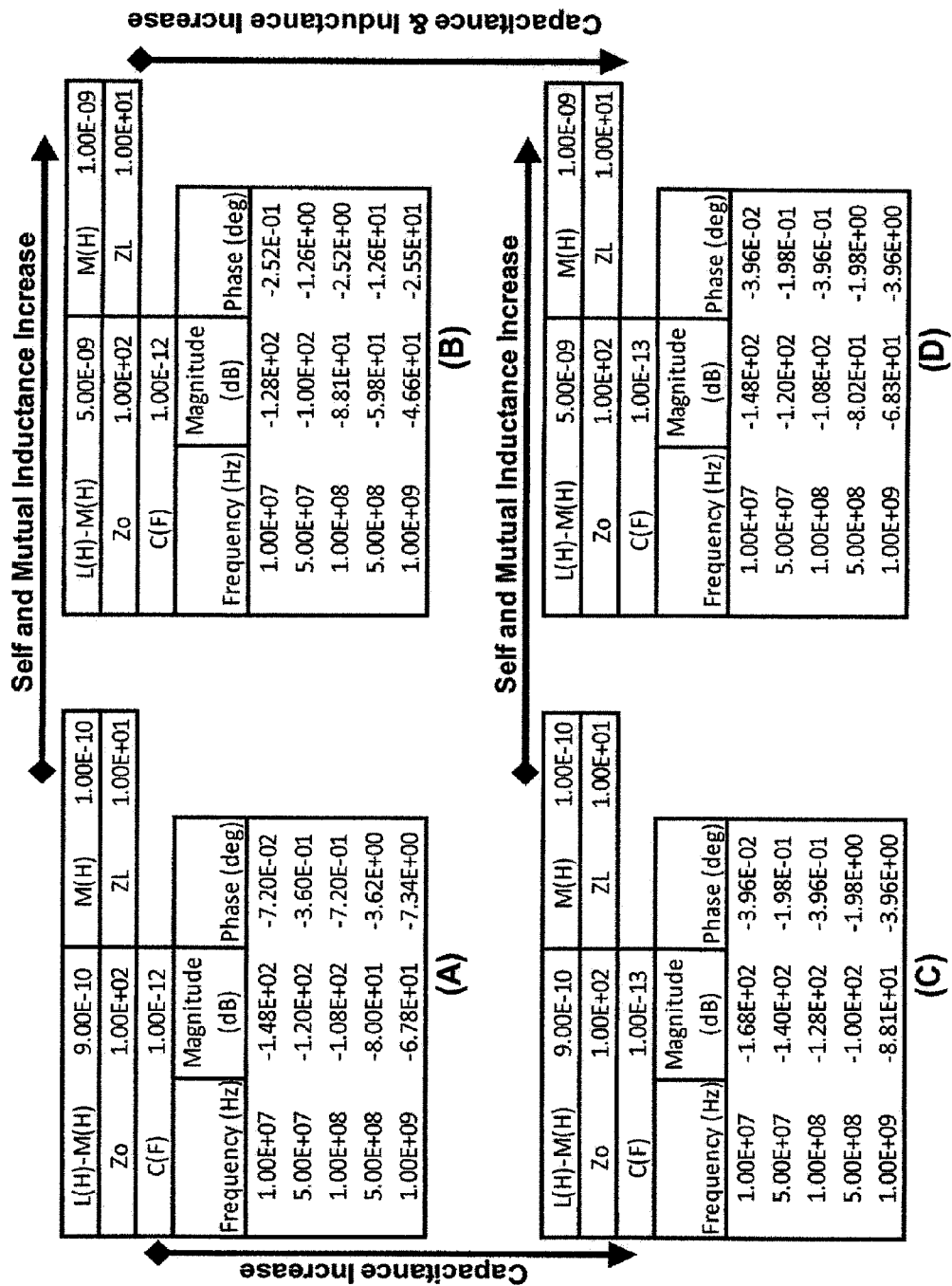
FIG. 19B illustrates a table showing the magnitude and phase of a coupling provided by an embodiment of a circuit of the present invention over a frequency range.

Hence, for the conditions stated above (i.e., $Z_{Load} \ll Z_o$ and that $Z_{Load} \ll 1/(\omega C)$, and $\omega L$ small compared to $Z_o$) for a given frequency range of interest the phase of the transfer function is approximately zero (note that in the transfer function's simplified expression for the phase, the argument in the arctangent function is a large positive value for typical connector component values). This implies that the output signal is in-phase with the input signal and the transfer function magnitude increases at a rate of approximately 40 dB/decade (note that the $\omega^2$ term in the simplified transfer function's magnitude expression produces the 40 dB/decade rate of increase). As shown in FIG. 17, this additional second compensating vector signal is represented by the vector $B_2$. The Table illustrated in FIG. 19B shows the resulting vector magnitudes and phases for the vector $B_2$ over several frequencies in the range of interest, and is constructed utilizing typical component values which are denoted at the top of each sub-table (i.e., (A), (B), (C), and (D)). Additionally, the difference in coupling between each sub-table is indicated via the arrows. For example, the capacitive coupling is increased from sub-table (A) to sub-table (C). Likewise, the self and mutual inductances increase from sub-table (C) to sub-table (D). As can be seen therefrom, the vector magnitude increases at a rate of approximately 40 db/decade and the phase is near zero at low frequencies.

Figure 20A:
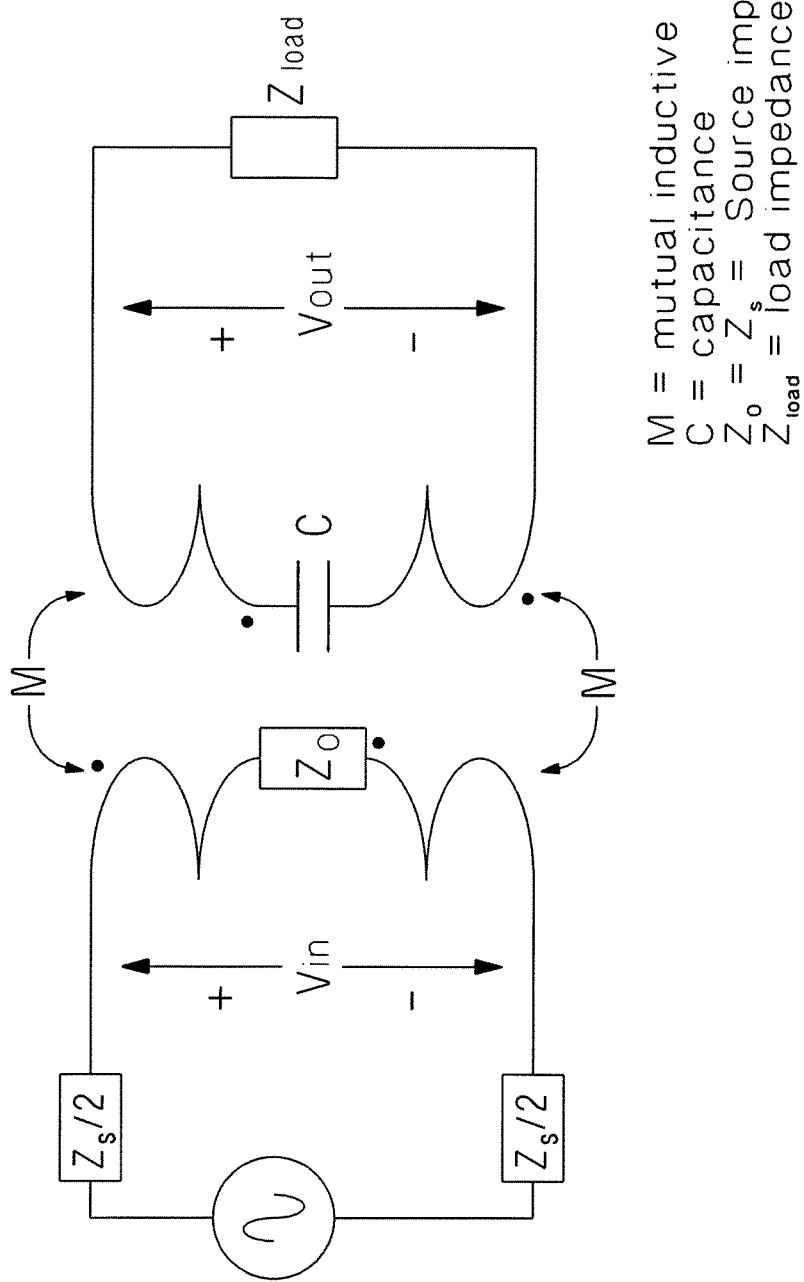
FIGS. 20A and 20B illustrate a differential circuit according to an embodiment of the present invention.
Figure 20B:
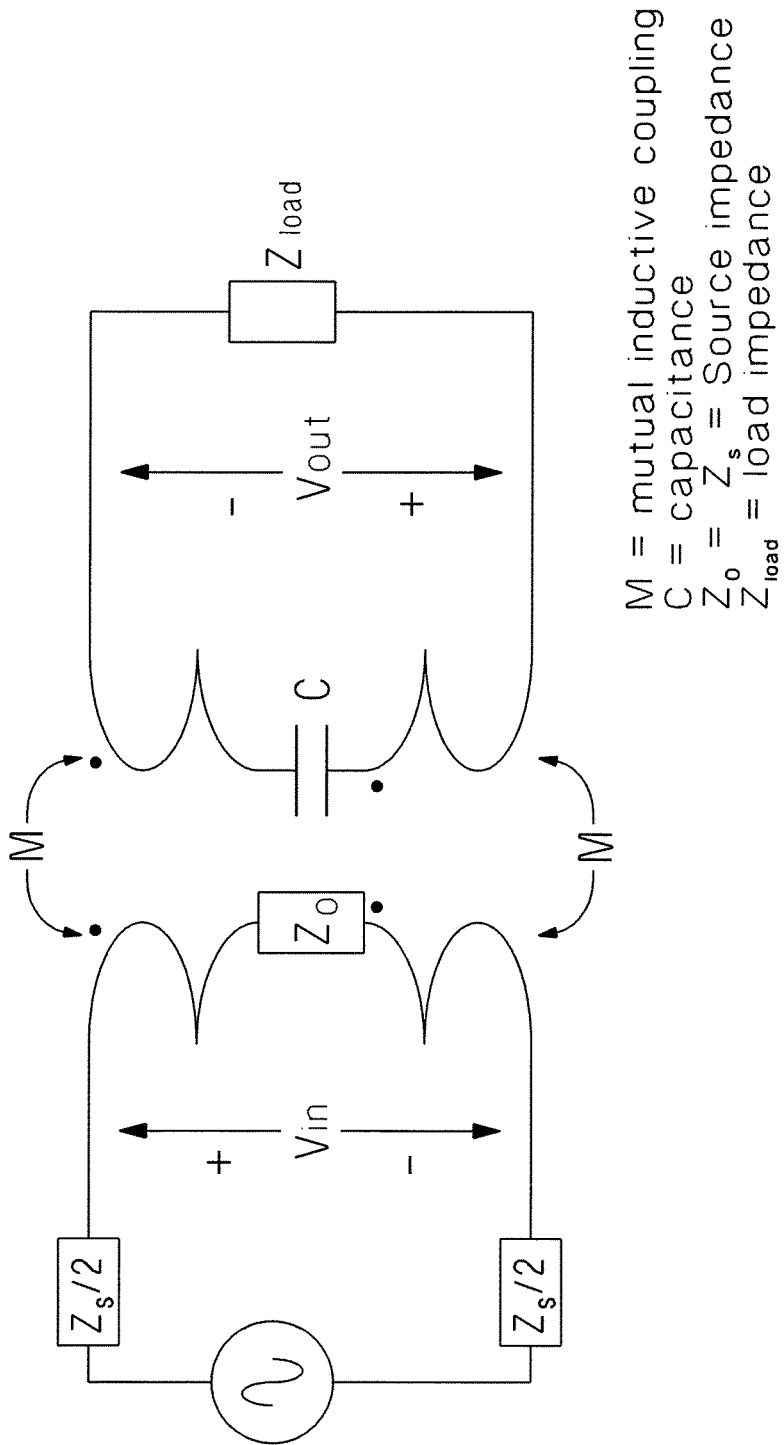

To utilize the conceptual circuit of FIG. 19A for differential circuitry as used in Ethernet connectivity, the circuit needs to be modified. The conceptual single-ended circuit in FIG. 19A can be equivalently modified to the differential conceptual circuit as shown below in FIG. 20A. Circuit simplification theorems are used which result in a conceptual differential circuit that has the same characteristics as derived for the single-ended circuit of FIG. 19A. FIG. 20A can also be equivalently re-drawn as shown in FIG. 20B where the secondary circuitry connected to the load is flipped.

In order to practically use the conceptual differential circuit in coupling applications between two differential wire-pairs, the circuit must be expressed in a form where the differential wire-pairs connect to the circuit. Hence, the conceptual differential circuit shown in FIG. 20B can be equivalently redrawn as an exemplary embodiment shown in FIG. 21. In the redrawn circuit, the outer "loop" 160 carries the signal that is to be coupled to the wire-pair to be compensated (the inner "loop" 165).

Figure 21:
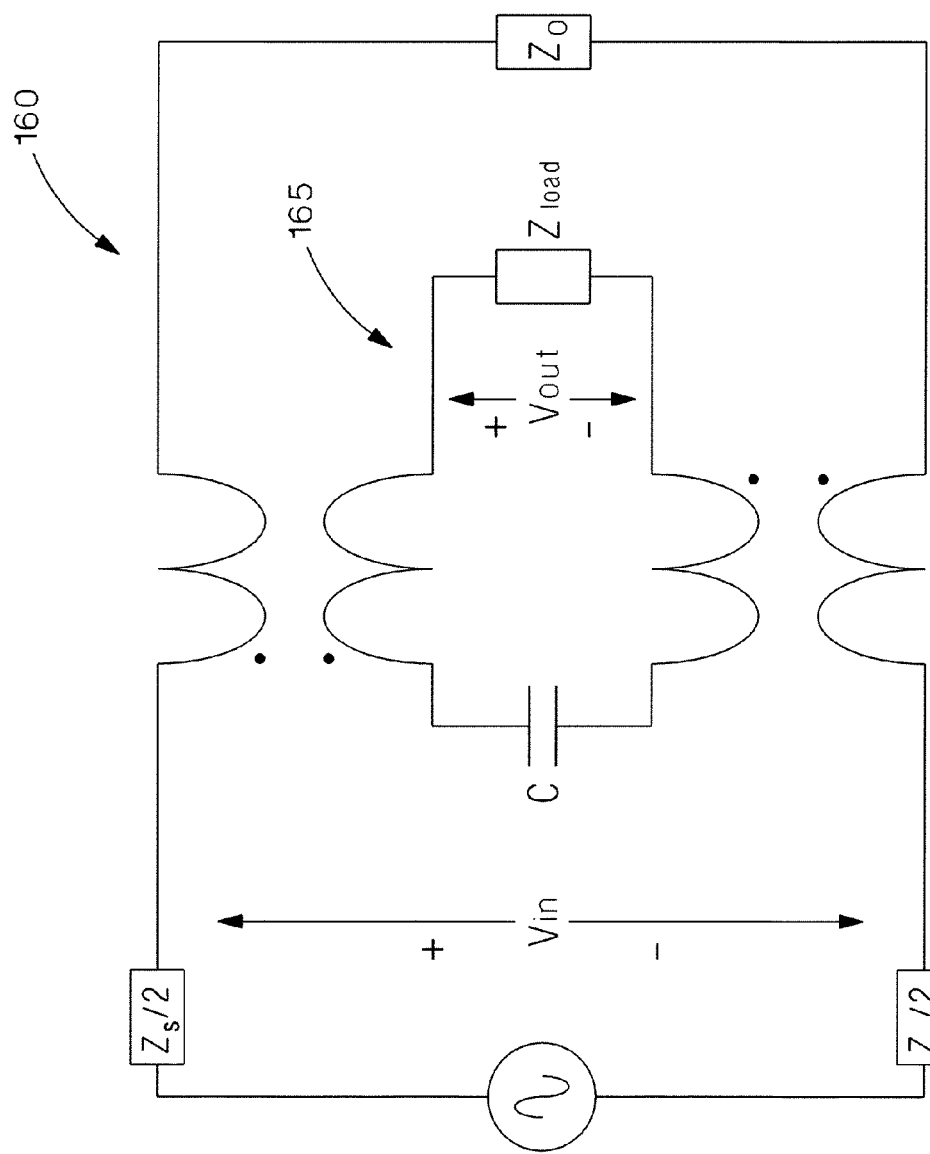
FIGS. 21 and 22 illustrate a differential circuit according to an embodiment of the present invention.
Figure 22:
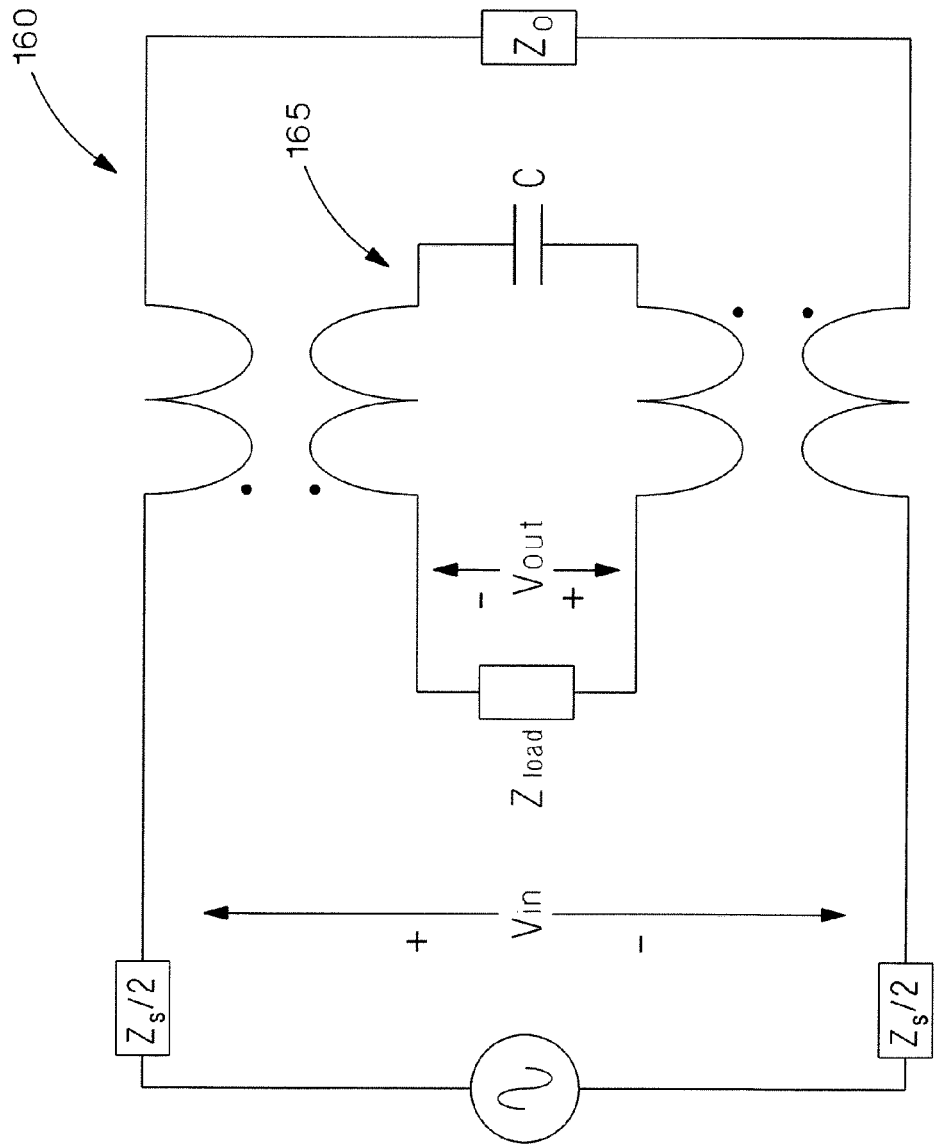

The inner "loop" circuitry 165 of FIG. 21 can be re-arranged as shown in FIG. 22. The re-arrangement may be desirable to show more clearly how the differential wire-pairs connect to the circuitry. The circuits of FIGS. 21 and 22 are equivalent to each other.

Figure 23:
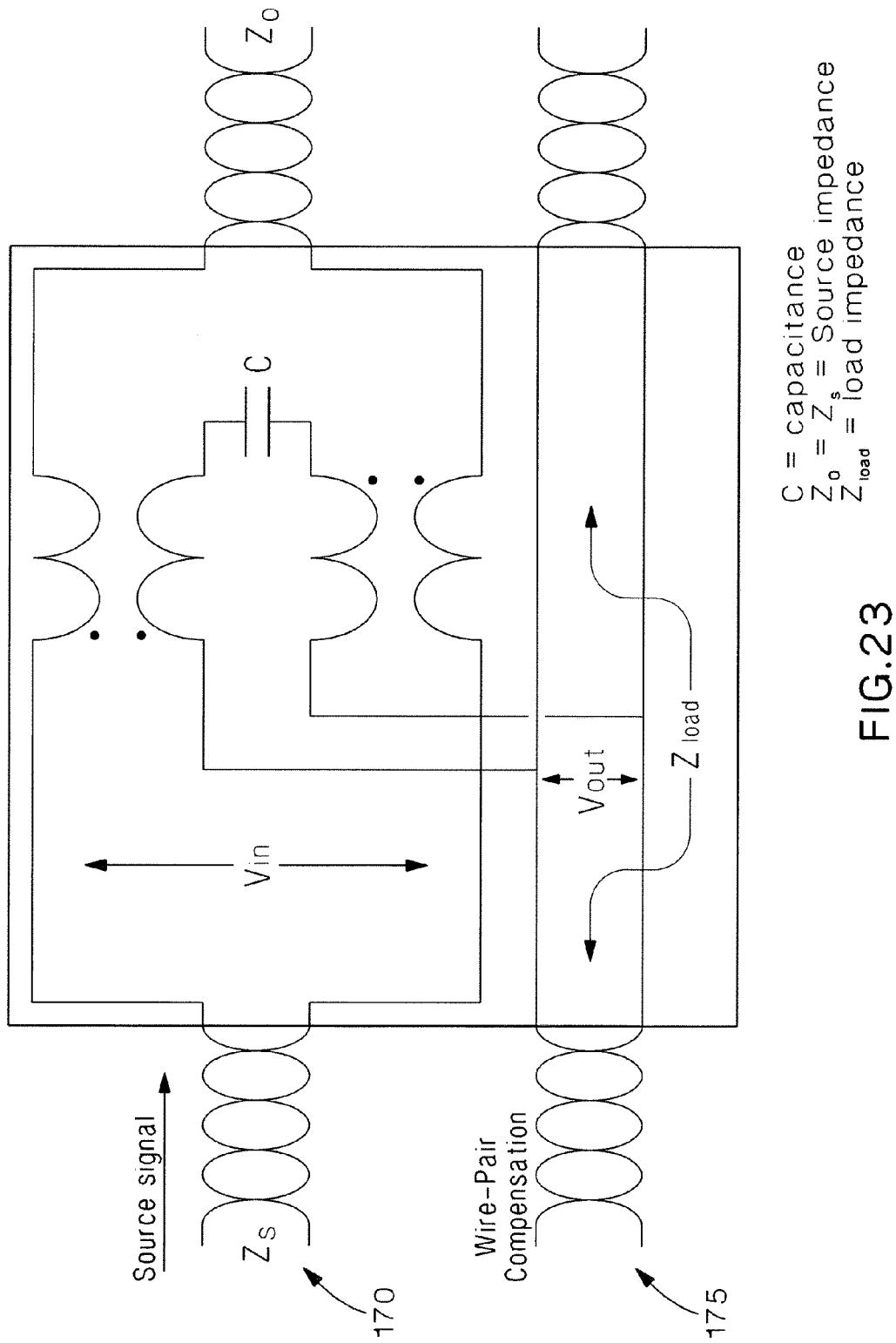
FIG. 23 illustrates a differential circuit according to an embodiment of the present invention.

The polarization of $V_{out}$ within the inner "loop" circuitry 165 as shown in FIG. 22 is flipped in contrast to the circuit in FIG. 21 in order for the circuits to be equivalent. FIG. 23 illustrates another circuit that is equivalent to the circuit of FIG. 22, having multiple differential wire-pairs 170,175.

Figure 24:
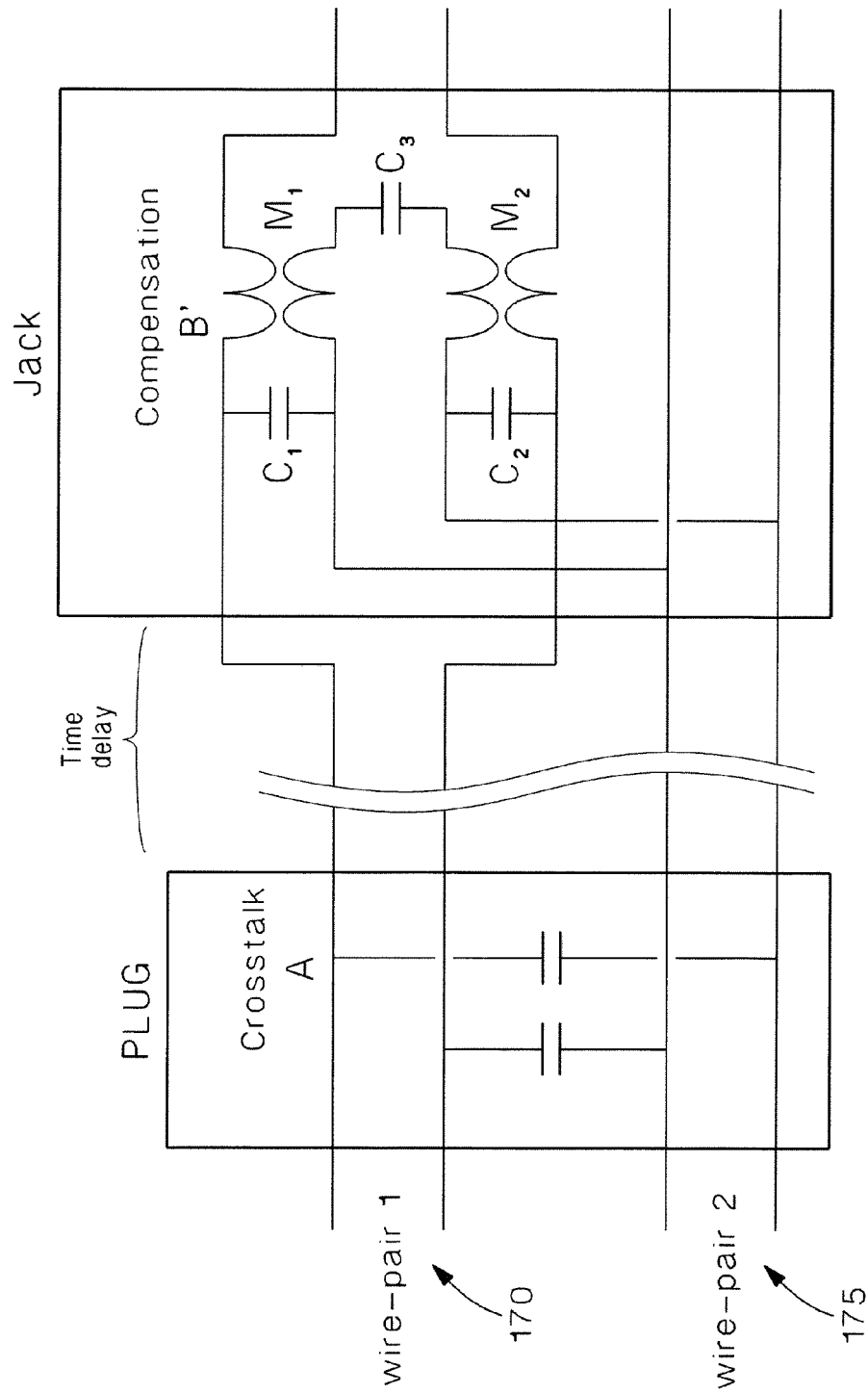
FIG. 24 illustrates a plug/jack system with differential circuit according to an embodiment of the present invention.

A more detailed representation of an embodiment of the OCN circuitry as employed in a plug jack combination is shown in FIGS. 24 and 25. Note that the two compensation vectors within the RJ45 jack occur at the same physical location (more clearly represented in FIG. 25). In practice, a mutual inductive coupling $M_1$ and $M_2$ inherently includes some capacitive coupling as well. The capacitive coupling can be taken advantage of and utilized as the first compensation vector's capacitance or a part of the first compensation vector's capacitance. FIG. 25 illustrates the mutual inductive coupling $M_1$ and $M_2$ and the parasitic capacitance $C_1$ and $C_2$ as a single combined element. This element can be called a capacitive mutual inductive coupler 180.

Figure 26:
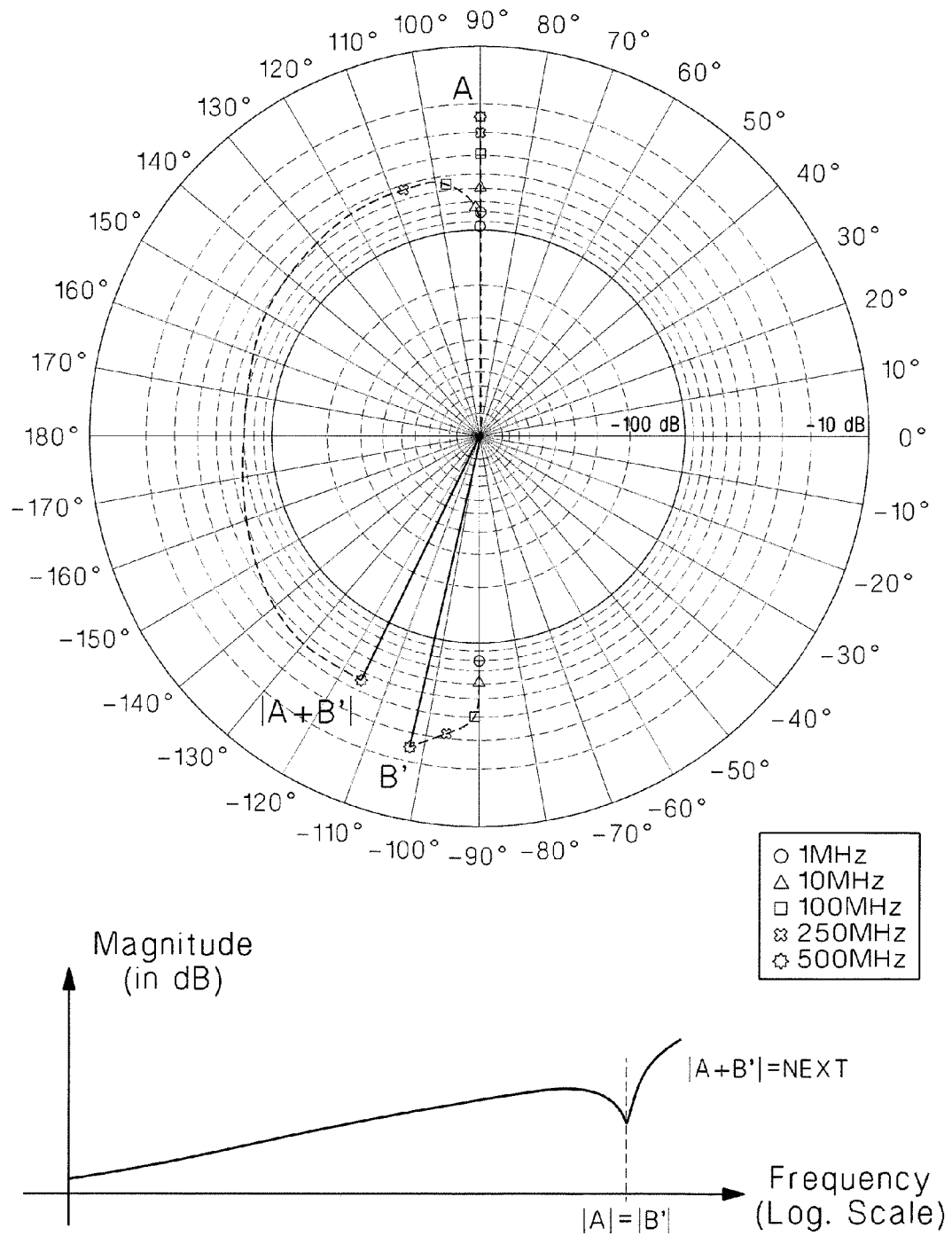
FIG. 26 illustrates a polar representation of the coupling in a system according to an embodiment of the present invention.

As described earlier in the explanation of FIGS. 17 and 18, we assumed that an ideal added second compensation vector $B_2$ would have an exact $-90°$ phase relation to the first compensation vector B. In reality, a mutual inductive coupling ill have a slight phase shift at lower frequencies (e.g., 1-10 MHz). The mutual inductive coupling phase shift can be offset by choosing the magnitude of coupling vector $B_1$ to be slightly smaller than the offending crosstalk coupling vector A. The resulting combination of vectors $B_2$ and $B_1$ generates a resultant vector B' (i.e., $B_2+B_1$) whose phase can be dominated by vector A in low frequency. The vector B' grows bigger in magnitude, with respect to vector A, as frequency increases (due to the faster growth of $B_2$ and its increasing phase shift) and dominates the overall resultant vector's (i.e., B'+A) phase. At one frequency point, the magnitude of vector A is exactly equal, or nearly equal, to the magnitude of B', resulting in the overall resultant vector taking a dip (i.e., a minimum) in magnitude. This is illustrated in FIG. 26 for a given combination of the time delay (between A and B') and component values. The polar axis chart in FIG. 26 illustrates the magnitude and phase of vectors A, B', and (A+B') relative to each other. The magnitudes of the couplings are presented in logarithmic (dB) scale relative to the source signal. The five dots present the vectors' position at frequencies of 1, 10, 100, 250, and 500 MHz. The magnitude graph of FIG. 26 illustrates the combined magnitude of A and B', and the dip (or the minimum) in the combined magnitude resulting from the magnitude of vector A being exactly equal, or nearly equal, to the magnitude of B'.

The parameters that control the performance of the RJ45 jack (performance as indicated by the overall magnitude of the resultant vector B'+A) can include: (i) the propagation delay from the offending plug-crosstalk to the compensation stage; and (ii) the OCN component values (i.e., C1, C2, M1, M2, and C3). In some embodiments of the present invention, a "null" or minimum magnitude of the overall resultant vector can be formed within the frequency range of interest and used to help meet connector NEXT specifications.

The following discussion is an effort to provide some prospective of the elements and methods for implementing the invention by listing two exemplary embodiments.

Figure 27:
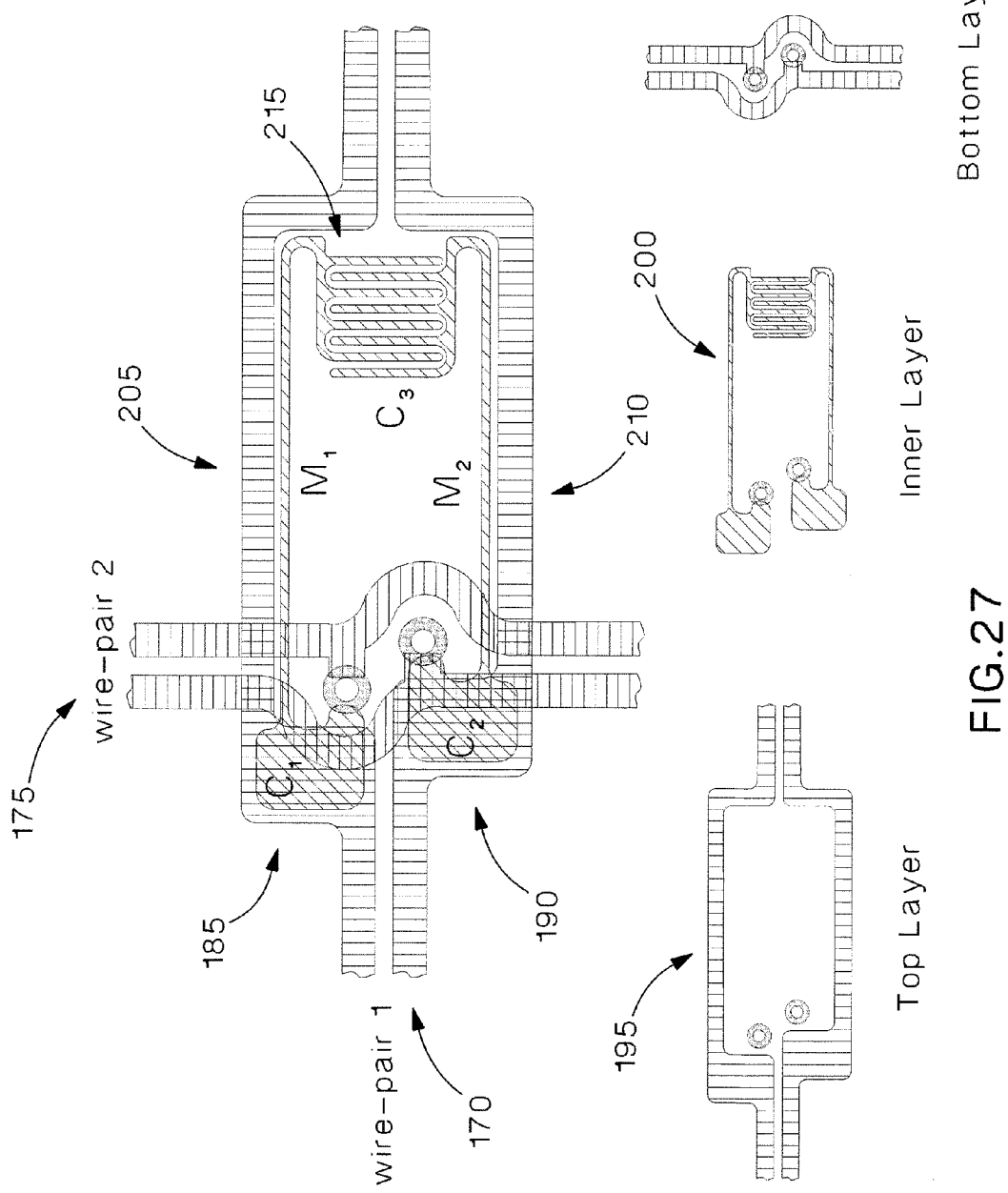
FIG. 27 illustrates an embodiment of a compensation circuit according to an embodiment of the present invention.

One such embodiment of the implementation of the OCN circuit is illustrated in FIG. 27. The capacitors $C_1$ and $C_2$ 185,190 form the compensation component of the OCN and are realized as pad capacitors between two layers of a printed circuit board (PCB) (e.g., a top layer 195 and an inner layer 200). The mutual inductive couplings $M_1$ and $M_2$ 205,210 form the additional compensation component of the OCN and are realized as parallel PCB traces in proximity to each other between two layers (e.g., in the top and inner layers 195,200). And the capacitance $C_3$ 215 is realized as a finger capacitor in one of the PCB layers (e.g., the inner layer 200).

Figure 28:
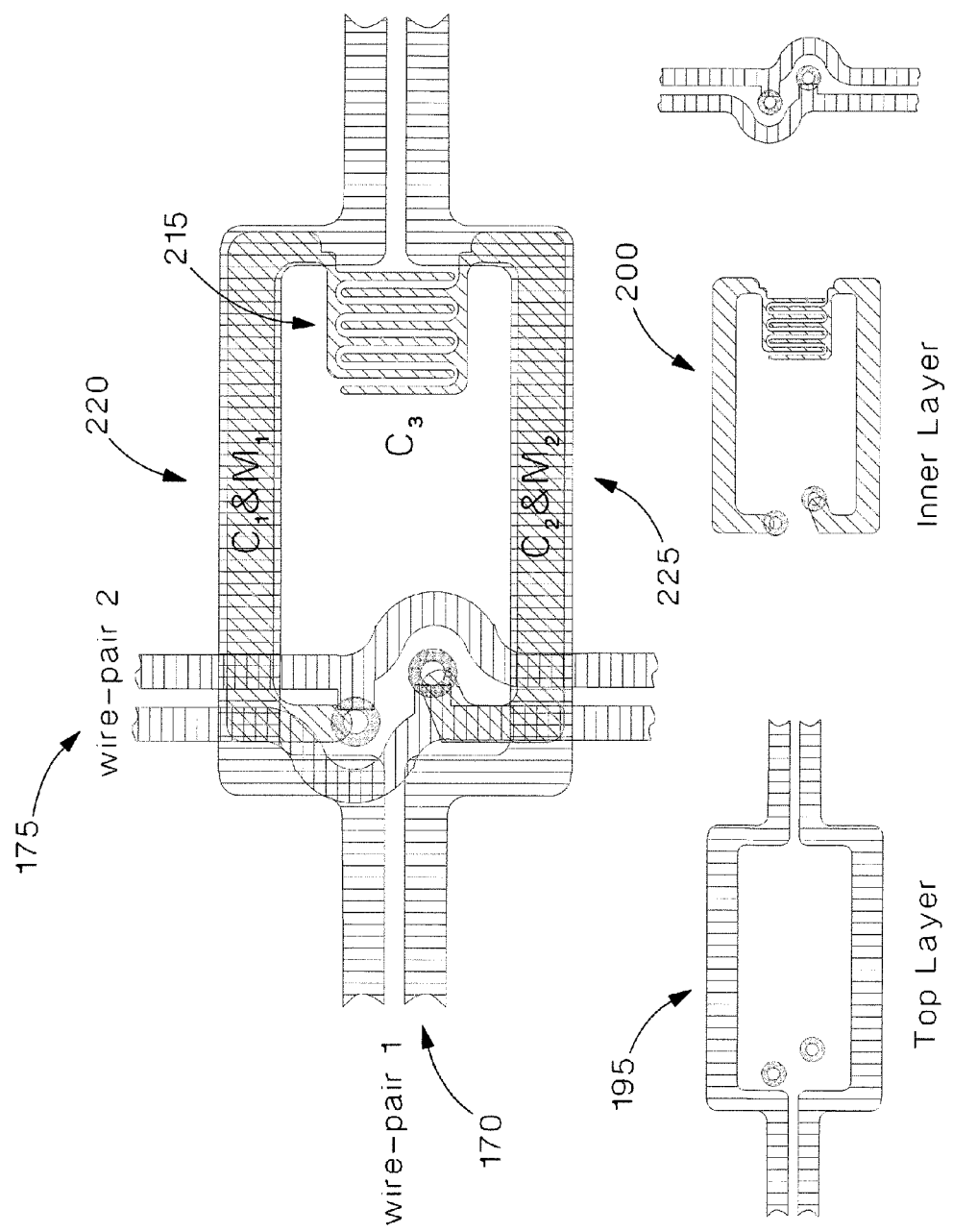
FIG. 28 illustrates an embodiment of a compensation circuit according to an embodiment of the present invention.

Another embodiment for the implementation of the OCN circuit is illustrated in FIG. 28. The capacitive coupling $C_1$ and mutual inductive coupling $M_1$ 220, and capacitive coupling $C_2$ and mutual inductive coupling $M_2$ 225 collectively form the compensation that is provided by this embodiment of the OCN. The capacitance is realized as trace-to-trace capacitors that run as parallel PCB traces through separate layers (also referred to as distributed capacitance). The capacitance C3 215 is again realized as a finger capacitor in the inner layer.

Figure 29A:
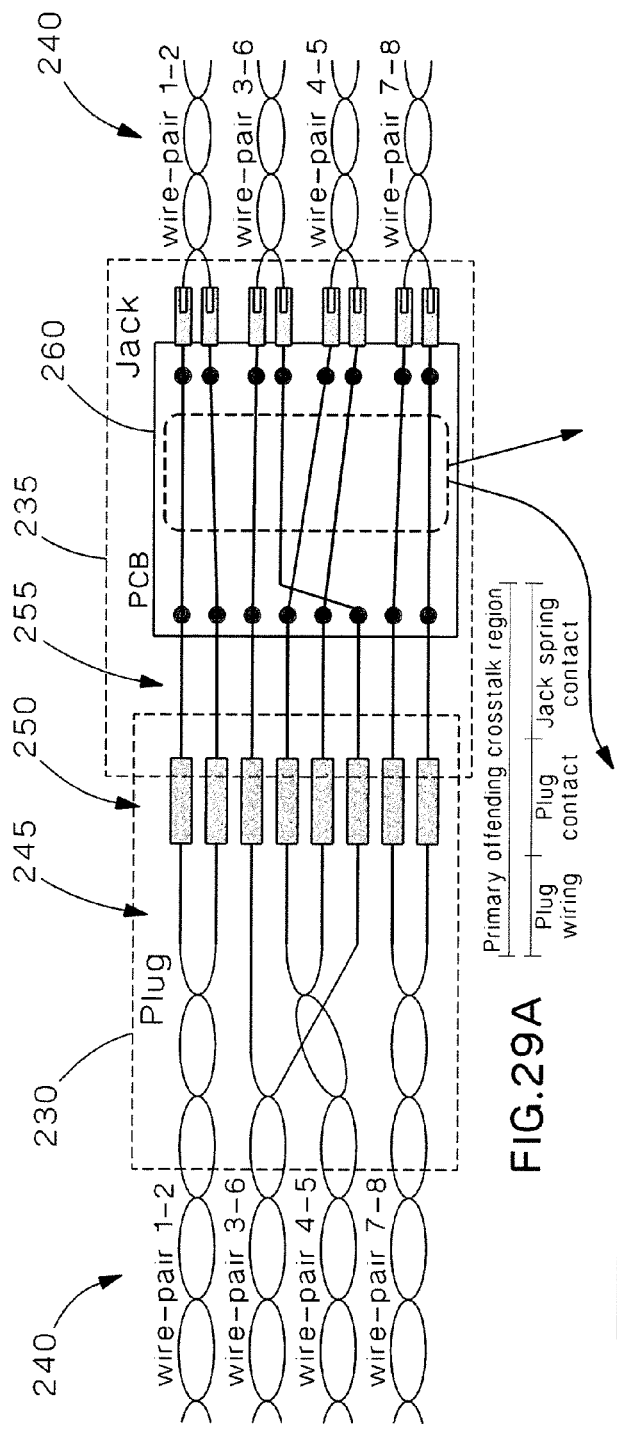
FIG. 29A illustrates a generalized representation of a communication plug mated to a communication jack which employs some compensation.
Figure 29C:
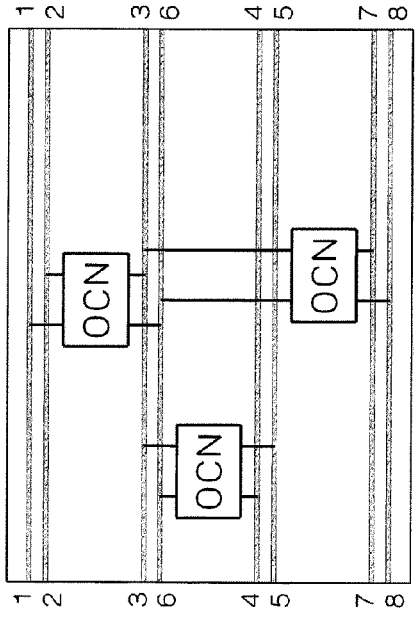
FIG. 29C illustrates compensation according to an embodiment of the present invention.
Figure 29B:
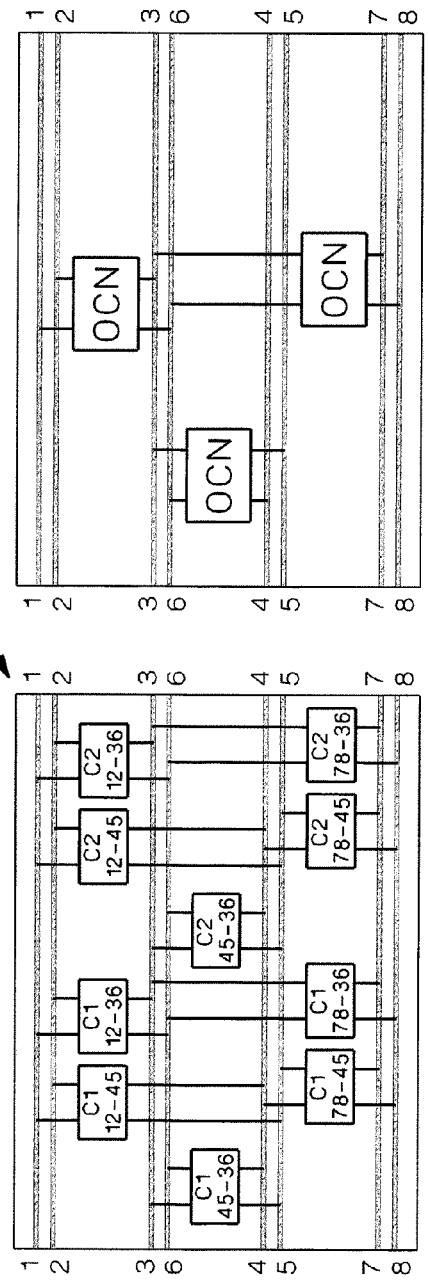
FIG. 29B illustrates an example of a known compensation technique.

The previous discussion focused on the implementation of a single stage OCN for a two-differential-pair system. However, OCN can be expanded to be implemented in multi-pair connectors (e.g., RJ45 connector system). FIGS. 29A-29C illustrate a multi-pair connector system generally showing both a traditional multi-stage compensation network and an OCN-based compensation network. FIG. 29A shows a plug-jack connector system having a plug 230 and a jack 235. Both the plug 230 and the jack 235 connect to respective network cables each with four differential wire-pairs 240. Due to the coupling which occurs in the general area of the plug wiring 245, plug contacts 250, and jack spring contacts 255, offensive crosstalk occurs. This offensive crosstalk can be compensated for by implementing various compensation techniques on a PCB 260 located within the jack 235. FIG. 29B shows a generalized representation of an implementation of a known compensation technique. FIG. 29C shows a generalized representation of an implementation of an OCN in accordance with one embodiment of the present invention. As can be seen in FIGS. 29B and 29C, the OCN based design can be less complex than a traditional multistage design. The simpler single-stage OCN compensation design may provide additional benefits such as, but not limited to: smaller magnitudes of compensation coupling elements, which minimizes effects on a wire-pair's impedance (resulting in better return loss); lower sensitivity to manufacturing tolerances (due to smaller component magnitudes); improved overall connector system balance; and lower sensitivity to the distance between the offending crosstalk location and compensation elements.

FIG. 30 illustrates a more detailed schematic view of FIGS. 29A and 29C. Here, the capacitive and inductive coupling which causes the resultant offensive crosstalk within a plug-jack system is compensated for via three separate OCN networks 265,270,275. The first OCN 265 appearing from the left is the compensation circuitry for wire-pairs 4,5 and 3,6. The second OCN 270 appearing in the middle is the compensation circuitry for wire-pairs 7,8 and 3,6. And the third OCN 275 appearing on the right is the compensation circuitry for wire-pairs 1,2 and 3,6. It is important to note that FIG. 30 is a schematic representation and should not be read as limiting as to the position of any particular OCN. Furthermore, the each OCN can operate independently, permitting the use of an OCN on any one wire-pair, or providing multiple OCNs on multiple wire-pairs.

Figure 31:
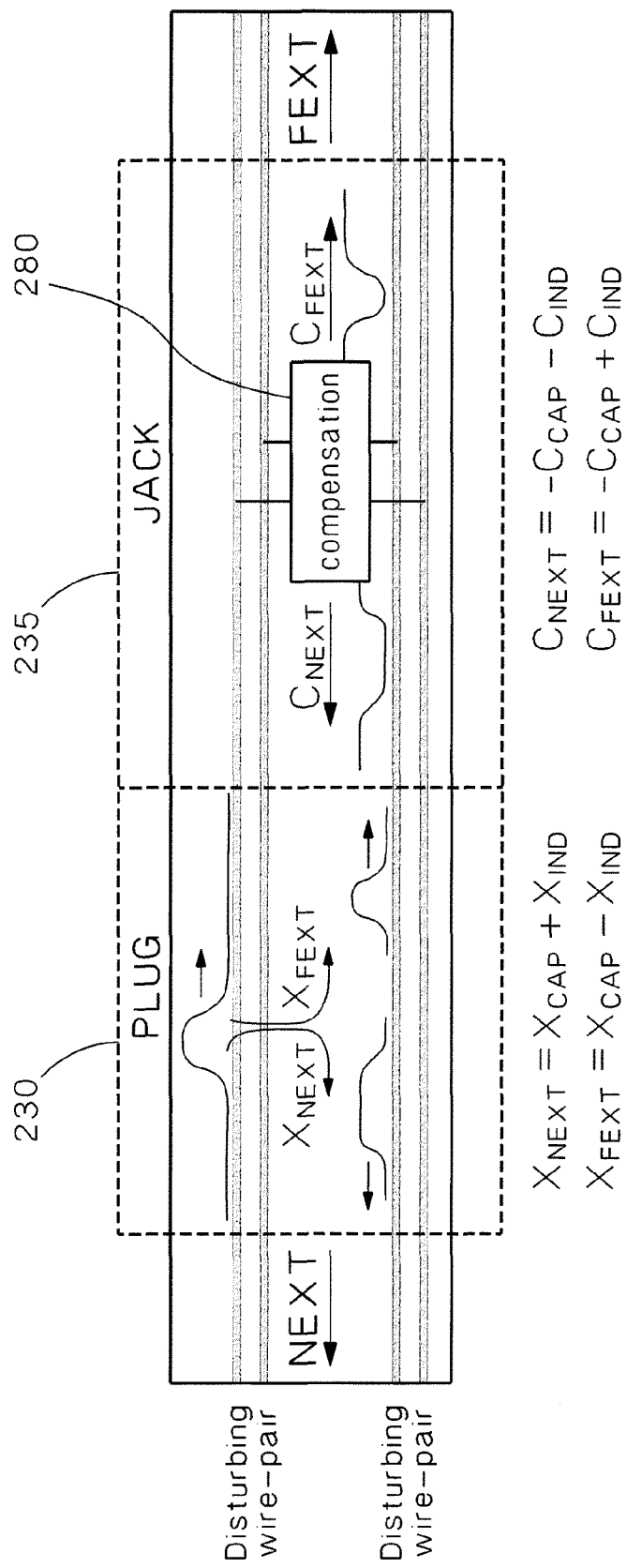
FIG. 31 illustrates a generalized representation of NEXT and FEXT within a plug/jack system.

Referring to FIG. 31, the offending NEXT arises from the summation of the overall capacitive and inductive couplings (denoted as "X" in FIG. 31) that are primarily located in the plug 230. With respect to NEXT, the OCN coupler 280 can provide improved compensation for both capacitive and inductive crosstalk.

Figure 32:
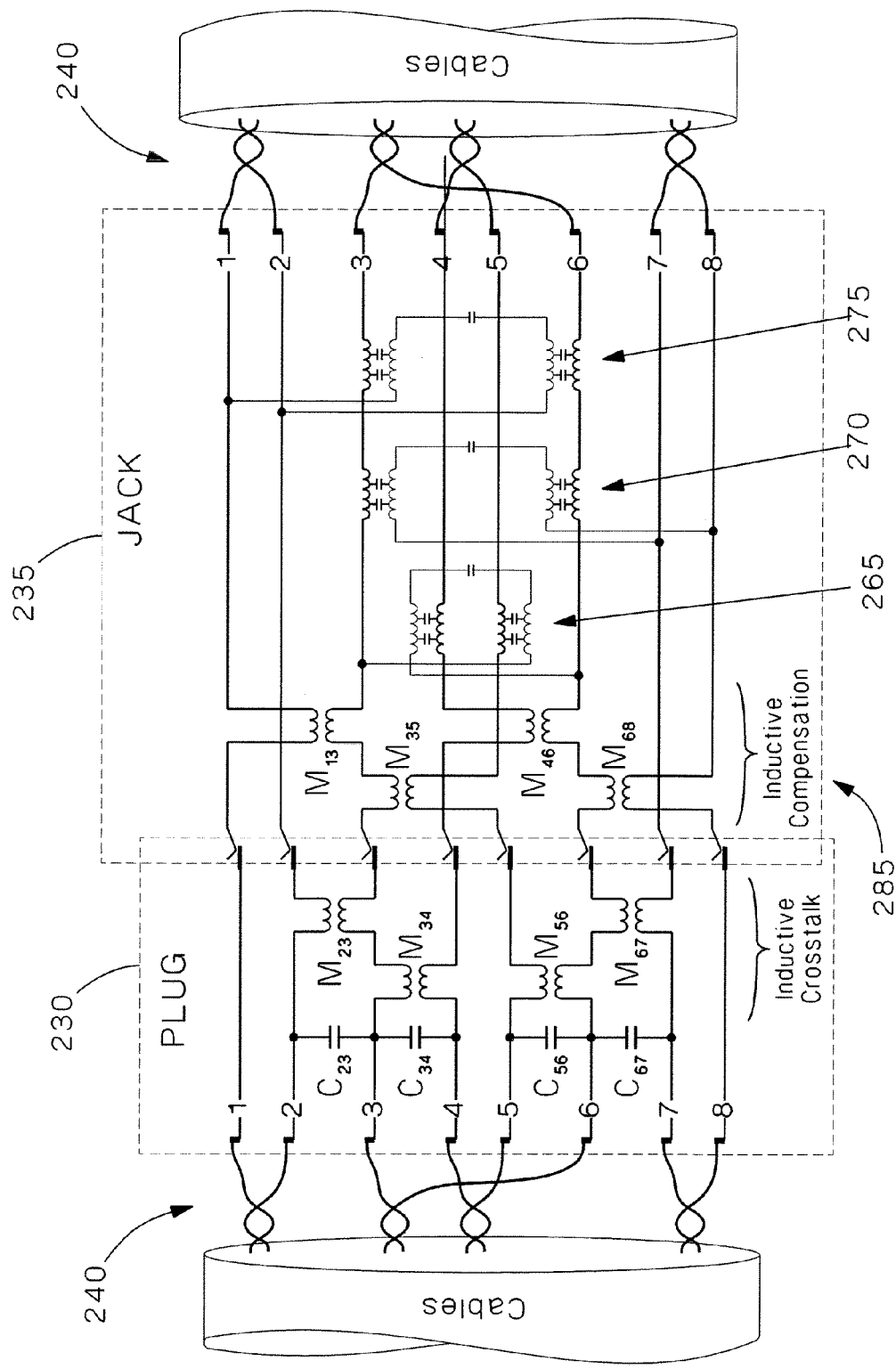
FIG. 32 illustrates an embodiment of the present invention having additional inductive compensation elements.

In addition to the offending NEXT coupling, there is a far-end crosstalk component produced called FEXT. FEXT arises from the difference between the offending capacitive and inductive couplings that occur primarily in the plug. In certain embodiments of the present invention, the OCN can be combined with additional inductive compensation elements 285, as shown in FIG. 32, to improve FEXT performance. Note that the additional inductive compensation components may not be required to meet FEXT requirements.

Note that while this invention has been described in terms of one or more embodiment(s), these embodiment(s) are non-limiting, and there are alterations, permutations, and equivalents, which fall within the scope of this invention. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. A communication connector, comprising:
a first differential pair of conductors and a second differential pair of conductors, wherein said first differential pair of conductors capacitively and mutual-inductively couples to said second differential pair of conductors, wherein said capacitive coupling and said mutual inductive coupling occur in approximately the same physical location and provide a compensation crosstalk signal to compensate for an offending crosstalk signal.

2. The communication connector of claim 1, wherein said capacitive coupling occurs as a result of at least one of discrete elements and distributed coupling.

3. The communication connector of claim 1, wherein said mutual inductive coupling occurs as a result of at least one of discrete elements and distributed coupling.

4. The communication connector of claim 1, wherein said mutual inductive coupling produces a mutual inductive coupling signal that is approximately orthogonal to a capacitive coupling signal produced by said capacitive coupling.

5. The communication connector of claim 1, wherein said capacitive coupling increases over a given frequency range at a first rate and said mutual inductive coupling increases over said given frequency range at a second rate, said second rate being greater than said first rate.

6. The communication connector of claim 1, further including a second capacitive coupling connected between said conductors of one of said first pair and said second pair.

7. A communication connector, comprising:
a compensation circuit for providing a compensating signal to approximately cancel an offending signal over a range of frequency, said compensation circuit including a capacitive coupling with a first magnitude growing at a first rate over said range of frequency and a mutual inductive coupling with a second magnitude growing at a second rate over said range of frequency, said second rate approximately double said first rate.

8. The communication connector of claim 7, wherein said mutual inductive coupling is approximately 90 degrees out of phase with said capacitive coupling.

9. The communication connector of claim 7, wherein said first rate is approximately 20 dB/decade and said second rate is approximately 40 dB/decade.

10. The communication connector of claim 7, further including a second capacitive coupling which activates said mutual inductive coupling.

11. The communication connector of claim 7, wherein said communication connector is a communication jack.

12. A method of compensating for an offending signal in a communication connector over a range of frequency, said method including the steps of:
providing a capacitive coupling; and
connecting a mutual inductive coupling approximately concurrently with said capacitive coupling, wherein said mutual inductive coupling is approximately orthogonal with said capacitive coupling, wherein said capacitive coupling and said mutual inductive coupling occur in approximately the same physical location.

* * * * *